(12) United States Patent
Kartashov et al.

(10) Patent No.: US 11,029,511 B2
(45) Date of Patent: Jun. 8, 2021

(54) LOW WAVEFRONT ERROR PIEZOELECTRICALLY ACTUATED OPTICAL ELEMENT

(71) Applicant: Polight ASA, Horten (NO)

(72) Inventors: Vladimir Kartashov, Horten (NO); Pierre Craen, Embourg (BE)

(73) Assignee: Polight ASA, Horten (NO)

( * ) Notice: Subject to any disclaimer, the term of this patent is extended or adjusted under 35 U.S.C. 154(b) by 121 days.

(21) Appl. No.: 16/487,763

(22) PCT Filed: Feb. 27, 2018

(86) PCT No.: PCT/EP2018/054804
§ 371 (c)(1),
(2) Date: Aug. 21, 2019

(87) PCT Pub. No.: WO2018/154139
PCT Pub. Date: Aug. 30, 2018

(65) Prior Publication Data
US 2020/0249466 A1  Aug. 6, 2020

(30) Foreign Application Priority Data
Feb. 27, 2017  (EP) .................................... 17158060

(51) Int. Cl.
*G02B 26/08* (2006.01)
*G02B 3/14* (2006.01)

(52) U.S. Cl.
CPC .......... *G02B 26/0858* (2013.01); *G02B 3/14* (2013.01)

(58) Field of Classification Search
CPC ....... G02B 26/0858; G02B 3/14; G02B 26/08
(Continued)

(56) References Cited

U.S. PATENT DOCUMENTS

2010/0182703 A1  7/2010  Bolis
2012/0104898 A1  5/2012  Qu et al.
(Continued)

FOREIGN PATENT DOCUMENTS

CN  101517453 A  8/2009
EP  2940505 A1  11/2015
(Continued)

OTHER PUBLICATIONS

Office Action for CN 201880013930.7 dated Jan. 14, 2021.
International Search Report for PCT/EP2018/054804 dated Jun. 25, 2018.

*Primary Examiner* — Euncha P Cherry
(74) *Attorney, Agent, or Firm* — Knobbe Martens Olson & Bear LLP

(57) ABSTRACT

There is presented an optical element (100, 500, 600, 700) comprising a support structure (101, 501) with a sidewall (112, 512), a bendable cover member (102, 502, 702) attached to the sidewall (112, 512), one or more piezoelectric actuators (103, 104, 105) arranged for shaping said bendable cover member (102, 502, 702) into a desired shape, wherein said optical element (100, 500, 600, 700) comprises an optically active area (111, 511) with an optical axis (110, 510), wherein an outer edge (215A-E) of the one or more piezoelectric actuators (103, 104, 105) as observed in a direction being parallel with the optical axis (110, 510) defines a first line, and an inner edge (109) of the support structure (101, 501) at the interface between the support structure (101, 501) and the bendable cover member (102, 502, 702) as observed in the direction being parallel with the optical axis (110, 510) defines a second line, wherein the first line and the second line as observed in the direction being
(Continued)

parallel with the optical axis (110, 510) cross each other in two or more positions and/or are parallel and coincident in one or more positions.

20 Claims, 11 Drawing Sheets

(58) Field of Classification Search
USPC .................................................... 359/224.1
See application file for complete search history.

(56) References Cited

U.S. PATENT DOCUMENTS

| 2013/0176628 A1* | 7/2013 | Batchko | ............... | G02B 26/005 |
| | | | | 359/665 |
| 2014/0104696 A1 | 4/2014 | Moreau et al. | | |

FOREIGN PATENT DOCUMENTS

| WO | WO 2008/035983 A1 | 3/2008 |
| WO | WO 2013/120800 A1 | 8/2013 |

* cited by examiner

½*3.7

Standard shape of the piezo-stack

LOW WAVEFRONT ERROR PIEZOELECTRICALLY ACTUATED OPTICAL ELEMENT

CROSS REFERENCE TO RELATED APPLICATIONS

This application is a U.S. National Phase Application of PCT International Application Number PCT/EP2018/054804, filed on Feb. 27, 2018, designating the United States of America and published in the English language, which is an International Application of and claims the benefit of priority to European Patent Application No. 17158060.8, filed on Feb. 27, 2017. The disclosures of the above-referenced applications are hereby expressly incorporated by reference in their entireties.

FIELD OF THE INVENTION

The present invention relates to optical elements, and more particularly a piezoelectrically actuated optical element, and corresponding use, optical device and method of manufacturing a piezoelectrically actuated optical element.

BACKGROUND OF THE INVENTION

There is an ever increasing demand for low cost, high volume solutions for optical elements, such as lens assemblies, with adjustable focal length and the highest possible imaging quality. Modern mobile phones, for example, are now equipped with miniature digital camera modules and the quality and cost demands for optical elements, such as lenses and lens assemblies, are increasing. More and more miniature cameras used in mobile phones and laptop computers have auto focus functionality. The design of, e.g., lens systems for such applications requires fulfilment of a large number of requirements, from production standards to ease of operation when fitting the lens on top of a camera module. These challenges are even greater when the lens arrangement comprises tuneable parameters, such as encountered in auto focus lenses, wherein the focal length must be adjusted, for example, to fit the distance from the lens to the object to be photographed. Such optical elements are usually complex designs comprising movable parts that can make it difficult to assemble the optical element in a simple manner. A further challenge with such designs is the ever increasing requirements to provide suitable optical elements, such as lens assemblies, for such use.

There exist a number of solutions for making compact auto focus optical elements. One of the problems of current solutions is how to provide good optical properties.

Hence, an optical element with improved optical properties would be advantageous, and in particular a tunable optical microlens with improved optical properties would be advantageous.

SUMMARY OF THE INVENTION

It may be seen as an object of the present invention to provide an optical element, such as a tunable optical element, that solves the above mentioned problems of the prior art, such as to provide an optical element (such as a tunable optical element) with improved optical properties. It maybe seen as a further object of the present invention to provide an alternative to the prior art.

Thus, the above described object and several other objects are intended to be obtained in a first aspect of the invention by providing an optical element comprising:
A support structure with a sidewall,
a bendable cover member attached to the sidewall,
one or more piezoelectric actuators arranged for shaping said bendable cover member into a desired shape,
wherein said optical element comprises an optically active area with an optical axis, wherein
an outer edge of the one or more piezoelectric actuators as observed in a direction being parallel with the optical axis defines a first line, and
an inner edge of the support structure at the interface between the support structure, such as the sidewall of the support structure, and the bendable cover member as observed in the direction being parallel with the optical axis defines a second line,
wherein the first line and the second line as observed in the direction being parallel with the optical axis
cross each other in two or more positions, such as in 2 or 3 or 4 or 8 or 16 or 32 or more positions, and/or
are parallel and coincident in one or more positions, such as in 1 or 2 or 3 or 4 or 8 or 16 or 32 or more positions, such as where remaining first line (such as a portion of the first line which is not parallel and coincident with the second line) is inside or outside a region encircled by the second line.

The invention is particularly, but not exclusively, advantageous for obtaining an optical element, such as optical (refractive) lens or a reflective element, such as a tunable microlens or a tunable micromirror, which may have improved optical properties, such as a low total wavefront error ($WFE_{RMS}$). The present inventors have made the insight, that it may be possible to obtain an optical element, even an optical element with small optically active area (such as optically active area, such as aperture, width less than 10 mm) and small thickness (such as thickness less than 1 mm), with a low total $WFE_{RMS}$ (such as below 60 nm).

By 'optical element' may be understood an element which acts upon (such as manipulates) light passing through the element (such as the element being an optical lens, such as an optical refractive lens) or which acts upon light being reflected from the optical element (such as the optical element being a reflective element or a mirror).

The optical element may in general be a tunable optical element. By 'tuneable' may be understood that a focal length of the optical element may be tuned, such as by changing the applied voltage of the one or more piezoelectric actuators arranged for shaping said bendable cover member into a desired shape.

By 'optically active area' may be understood an area upon which light may be incident and may be manipulated. For an optical lens the optically active area may correspond to (such as be identical to) the optical aperture. For a reflective element, such as a mirror, the optically active area may be a reflective area upon which light may be incident and from which manipulated light may be reflected (such as analogously to an aperture for an optical lens).

'Optical axis' is commonly understood in the art, and is understood to intersect the cover member (and, in case of the optical element being an optical lens, the optical axis is also understood to intersect the lens body), such as pass through the lens body and the cover member. In the present context, the one or more piezoelectric actuators may be defining the optically active area, such as (in case of the optical element being an optical lens) an optical aperture of the at least one deformable lens body on the bendable (transparent) cover member, such as the one or more piezoelectric actuators being arranged so as to surround or encircle, such as completely surround or encircle, the optically active area, such as an optical aperture.

'Piezoelectric actuators' are known in the art, and are in the present context understood to include electrode layers in their various configurations, such as an electrode (e.g., platinum) layer on each side (such as above and below) of a piezoelectric material (such as piezoelectrically active material, such as a piezoelectrically active layer), or an electrode layer only on one side (such as above or below) of the piezoelectric material, such as an electrode layer comprising interdigitated electrodes, such as interdigitated electrodes described in the reference WO 2014/048818 A1 which is hereby included by reference in entirety. The piezoelectric material can be made of any standard type of the piezo-material by known technology (such as sputtering og sol-gel or any other). The top and bottom electrodes can be made of any metal compatible with the technology of the piezo-film deposition, for example made of Pt or Au. In embodiments, which may be combined with any other embodiment, the one or more piezoelectric actuators is at least one piezoelectric actuator, such as one piezoelectric actuator, which is completely encircling the optical axis, such as one coherent piezoelectric actuator, which is completely encircling the optical axis, such as one and only one piezoelectric actuator, which is completely encircling the optical axis. By "coherent" is understood one element, such as one contiguous element, such as one element which comprises only portions which are not separated from each other. It may furthermore be understood that the coherent element forms a closed line around a through-going hole in the middle, such as wherein said hole in the middle is intersected by the optical axis, such as wherein a line parallel with the optical axis cannot be moved from the position of the optical axis to outside the piezoelectric actuator without intersecting the piezoelectric actuator.

In an embodiment there is presented an optical element, wherein the one or more piezoelectric actuators comprise one piezoelectric actuator, which encircle the optical axis, such as defines the optical aperture, such as an inner edge (corresponding to the edge of the one piezoelectric actuator facing towards the optical axis) of the piezoelectric actuator towards the optical axis forms a circle, such as a circle with the optical axis at its center. In an embodiment the one or more piezoelectric actuators comprise one piezoelectric actuator, which encircle the optical axis where an inner edge (corresponding to the edge of the one piezoelectric actuator facing towards the optical axis) of the piezoelectric actuator towards the optical axis forms a circle with the optical axis at its center. In an embodiment there is presented an optical element, with a through-going hole being intersected by the optical axis, such as wherein said through-going hole being circular, such as a circle with the optical axis at its center.

By 'arranged for shaping said bendable cover member into a desired shape', may be understood that the shape, size and position of the actuators relative to the cover member enables them upon actuation, such as upon an applied voltage across their electrodes, to deform and thereby shape said bendable cover member into a desired shape'. It is understood, that at least a portion of the cover member is in the optically active area, such as the optical aperture, such as the portion of the cover member being intersected by the optical axis is being shaped into a desired shape.

By 'desired shape' may be understood that when going from a shape to a desired shape (such as from one desired shape to another desired shape), then the focal length of the optical element may change.

The one or more piezoelectric actuators are placed on the opposite side of the cover member with respect to the support structure.

Having the one or more piezoelectric actuators arranged so that a virtual straight line drawn parallel to the optical axis through the inner edge of the sidewall will at one or more points along the inner edge of the sidewall intersect or lie tangent to the one or more piezoelectric actuators may enable that the one or more piezoelectric actuators may utilize a cantilever principle thereby amplifying the maximal radius of curvature (of the cover member), even in the optically active area, such as the optical aperture, where no actuators are present.

By 'an outer edge of the one or more piezoelectric actuators as observed in a direction being parallel with the optical axis' may be understood a line along the outer edge for the one or more piezoelectric actuators as observed in a top-view. If the one or more piezoelectric actuators form a closed line or closed structure (where it may be understood that 'closed line' may be substituted with 'closed structure', wherein it is understood that the closed structure has a finite width), which completely encloses the optical axis, then the outer edge may be a closed line corresponding to the edge of the one or more piezoelectric actuators facing away from the optical axis (where it is understood that the outer edge is the outer edge of the one or more piezoelectric actuators, such as of the one piezoelectric actuator enclosing the optical axis, which edge is facing away from the optical axis). If the one or more piezoelectric actuators comprise one or more piezoelectric actuators which are not completely enclosing the optically active area, then the outer edge may be seen as the edge of the one or more piezoelectric actuators which are not completely enclosing the optically active area. In case there is more than one piezoelectric actuator, it may be understood that at least one of the outer edges may be selected as the outer edge (such as at least one outer edge—corresponding to one of the piezoelectric actuators—satisfies the claimed features). In a particular embodiment, there is one and only one piezoelectric actuator.

A possible advantage of having the one or more piezoelectric actuators forming a closed line may be that it yields a simple solution, which nevertheless enables a low total wavefront error.

By 'an inner edge of the support structure at the interface between the support structure and the bendable cover member as observed in the direction being parallel with the optical axis' may be understood a line along the inner edge—such as the edge facing the optical axis—of the support structure observed in a top-view. This line is defined to be at the interface between the support structure and the bendable cover member.

It may be seen as advantageous that by arranging the first line and the second line so that 'the first line and the second line as observed in the direction being parallel with the optical axis
  cross each other in two or more positions and/or
  are parallel and coincident in one or more positions'
the total wavefront error $WFE_{RMS}$ of the optical lens may be reduced. It may be particularly advantageous that the first and second line cross each other, since this may enable achieving the lowest total wavefront error $WFE_{RMS}$, such as the lowest average total wavefront error $WFE_{RMS}$ across a range of voltages applied to the one or more piezoelectric actuators. By 'parallel and coincident' may be understood substantially parallel and substantially coincident, such as parallel and coincident. 'Coincident' may imply that the second line is within 20 micrometer, such as within 10 micrometer, such as within 5 micrometer, such as within 2 micrometer, such as within 1 micrometer, such as within 0.1 micrometer, from the first line, such as that a distance between the first and the second line is substantially zero or zero micrometer. By 'position' may be understood a set of coordinates (for example a line along which the first and second line are parallel and coincident) or a coordinate or a point (for example a point where the first and second line are parallel and coincident or a point where the first and second line cross each other). It may in general be understood that the 'position' may be a point or line of contact between the first and second curve, such as any one of a $0^{th}$-order contact, a $1^{st}$-order contact, a $2^{nd}$-order contact, a $3^{rd}$-order contact and a $4^{th}$-order contact, where two curves in the plane intersecting at a point p are said to have $0^{th}$-order contact if the curves have a simple crossing (not tangent), $1^{st}$-order contact if the two curves are tangent, $2^{nd}$-order contact if the curvatures of the curves are equal. Such curves are said to be osculating, $3^{rd}$-order contact if the derivatives of the curvature are equal and $4^{th}$-order contact if the second derivatives of the curvature are equal. In a particular embodiment, 'coincident and parallel' is understood to mean 'tangent'.

It may in general be understood when referring to optical properties within this application, that the optical property (such as transmittance or opacity or transparency or reflectivity) applies for light travelling within an angle of incidence (AOI) with respect to the optical axis, such as through the optical aperture (for an optical lens) or being reflected of the optically active area (for a reflective element), wherein the angle of incidence is within an angle of 0-65°, such as 0-40° (such as 0°) with respect to the optical axis. An optical property may be understood to be an optical property at a specific wavelength, such as any wavelength within the visible region, such as 630 nm, and/or at a specific angle of incidence, such as 0°, such as at a wavelength of 630 nm and at an angle of incidence of 0°.

When referring to 'average' of an optical property, it is understood as a double average of said property within a wavelength range and an angle of incidence (AOI) with respect to the optical axis, wherein the wavelength range may be within nm to 1 mm, such as wherein the wavelength range may correspond to one or more or all of:
the ultraviolet (UV) region, such as within 10-380 nm,
the visible (VIS) region (which humans perceive or see as 'light'), such as within 380-760 nm
the near-infrared (nIR) region, such as within 760-2,500 nm,
the mid-infrared (mIR) region, such as within 2.50-10 micrometer,
the far-infrared (fIR) region, such as within 10 micrometer-1 mm,
and wherein AOI is 0-65°, such as 0-40°.

'Optical' is to be understood as relating to 'light', and 'light' is understood to be electromagnetic radiation within one or more or all regions corresponding to UV, visible, nIR, mIR and fIR, such as within the visible region.

By 'opaque' may be understood an average (within a wavelength range and within the angle of incidence range) transmittance of 10% or less, such as 1% or less, such as 0.1% or less, for light travelling through the opaque material.

Reference to 'transparent' is generally understood with reference to light, i.e., light may pass through a transparent object, with little or no intensity loss, such as losing on average 10% or less, such as on average 5% or less, when passing through the material (corresponding to an average transmittance of, respectively 90% and 95%).

By 'transmittance', such as the specular transmittance or regular transmittance, may in the present context of transmittance with respect to the optical element, such as the optical lens, be understood the average (within a wavelength range and within the angle of incidence range) ratio between
Light being incident on the optical lens, and
a portion of the light being incident on the optical lens, which portion is transmitted through the optical lens and emitted on the other side as specularly (regularly) transmitted light.

By 'sidewall' may be understood a support element, which at least partially supports the bendable cover member, such as supports the bendable cover member in a region immediately outside or close to the optically active area, such as the optical aperture.

The bendable cover member may be relatively thin, such as thin with respect to the support structure (and/or the lens body when present) in a direction along the optical axis, e.g. less than 1 mm, such as less than 0.75 mm, such as less than 0.5 mm, such as [10; 40] micrometer (i.e., within 10-40 micrometer). It may be made of any type of glass, such as any standard type of glass, or other material such as ceramic-glass, polymer, polymer-inorganic hybrid, such as being a so-called cover glass or being similar to a cover glass. These materials may in particular be relevant in embodiments where the bendable cover member should be transparent. By 'bendable' may be understood that an element, such as the bendable cover member, may be bent by the one or more piezoelectric actuators, i.e., actuation of the one or more piezoelectric actuators may bend the element. The 'bendable cover member' may be referred to interchangeably with "cover member".

In an embodiment there is presented an optical element, wherein the optical element is comprising:
A support structure with a sidewall,
a bendable cover member attached to
the sidewall,
one or more piezoelectric actuators arranged for shaping said bendable cover member into a desired shape, wherein the one or more piezoelectric actuators comprise piezoelectric material and electrode layers above and/or below the piezoelectric material,
wherein said optical element comprises an optically active area with an optical axis, wherein
the one or more piezoelectric actuators form a closed line, which completely encloses the optical axis, and an outer edge of the one or more piezoelectric actuators as observed in a direction being parallel with the optical axis defines a first line, wherein the outer edge is a closed line corresponding to the edge of the one or more piezoelectric actuators facing away from the optical axis, and
an inner edge of the support structure, such as the sidewall of the support structure, at the interface between the support structure and the bendable cover member as observed in the direction being parallel with the optical axis defines a second line,
wherein the first line and the second line as observed in the direction being parallel with the optical axis
cross each other in two or more positions, such as in 2 or 3 or 4 or 8 or 16 or 32 or more positions, and/or are parallel and coincident in one or more positions, such as in 1 or 2 or 3 or 4 or 8 or 16 or 32 or more positions, such as where remaining first line (such as a portion of the first line which is not parallel and coincident with the second line) is inside or outside a region encircled by the second line.

It is understood, that since 'above' and 'below' refer to a direction parallel to the optical axis, where above is in a positive direction from the support structure to the cover member and where below is in a negative direction from the support structure to the cover member, it may be understood that the one or more piezoelectric actuators do not include electrode material placed elsewhere, e.g., at a position where a line parallel with the optical axis does not intersect the piezoelectric material.

In an embodiment there is presented an optical element, wherein above and below refer to a direction parallel to the optical axis where above is in a positive direction from the support structure to the cover member and where below is in a negative direction from the support structure to the cover member.

In an embodiment there is presented an optical element, wherein one or more portions of the electrode layers above and/or below the piezoelectric material, which are comprised in the one or more piezoelectric actuators, are the one or more portions, which are intersected by a line parallel to the optical axis, which line also intersects the piezoelectric material.

In an embodiment there is presented an optical element, wherein one or more areas, as observed in a direction being parallel with the optical axis, of the one or more piezoelectric actuators, are the one or more areas, which are intersected by a line parallel to the optical axis, which line intersects the piezoelectric material and the electrode layers above and/or below the piezoelectric material.

In an embodiment there is presented an optical element, wherein the optical element comprises:
  a. A bottom electrode (103), such as an electrode layer below the piezoelectrically active layer,
  b. Piezoelectric material in the form of a piezoelectrically active layer (104), and
  c. A top electrode (105), such as an electrode layer above the piezoelectrically active layer,
and wherein the position of the one or more piezoelectric actuators, as observed in a direction being parallel with the optical axis (110, 510), is given by positions wherein there is an overlap between all of the bottom electrode (103), the piezoelectrically active layer (104) and the top electrode (105). It may be noted that only in these positions can the piezoelectrically active layer be actuated.

In an embodiment there is presented an optical element, wherein the second line defines a square without rounded corners or a rectangle without rounded corners. In an embodiment there is presented an optical element, wherein the second line defines a rectangle with rounded corners or a superellipse.

In an embodiment there is presented an optical element, wherein the second line defines a square with rounded corners. In an embodiment there is presented an optical element, wherein the second line defines a rectangle with rounded corners. In an embodiment there is presented an optical element, wherein the second line defines a superellipse In an embodiment there is presented an optical element, wherein the second line is non-circular.

In an embodiment there is presented an optical element, wherein the first line is a square with rounded corners, such as a square with circularly rounded corners.

In an embodiment there is presented an optical element, wherein the first line is substantially circular, such as circular.

In an embodiment there is presented an optical element, wherein the optical element is a refractive lens comprising:
  at least one deformable transparent lens body surrounded by the sidewall of the support structure,
  and wherein the bendable cover member is a bendable transparent cover member which is attached to
    a surface of said at least one deformable transparent lens body.

In an embodiment there is presented an optical element, wherein the optical element does not comprise liquid. In an embodiment there is presented an optical element, wherein the optical element is solid or gaseous, such as consists of solid or gaseous elements. In an embodiment there is presented an optical element, wherein the optical element is solid, such as consists of solid elements.

'Refractive lens' is known in the art and understood accordingly. An advantage of refractive lenses may be that they require only low maintenance and generally do not require collimation or recoating to the same extent as reflective elements.

The optical lens may in general be a microlens. By 'microlens' may in general be understood a lens wherein a dimensions of at least one structural component, such as the thickness, is within the range 1 micrometer to 1 millimeter. In the present application, reference to thickness is a reference to geometrical thickness (as opposed to optical thickness). In an embodiment, the thickness may be the sum of the support structure (e.g., silicon), which may be 200-800 micrometer, the cover member and the one or more piezoelectric actuators including electrical contacts, which may be about 22 micrometer. The optical lens may be a tuneable microlens known as a TLens® obtainable from the company poLight, Norway. The optical lens may in particular be a tuneable microlens corresponding to the tuneable microlens disclosed in the patent application WO2008100154 (A1) with the title "Flexible lens assembly with variable focal length", which application is hereby included by reference in entirety. It is additionally noted regarding the reference WO2008100154 (A1) that certain dimensions may be converted from micrometers into millimeters, and in particular the dimensions referred to as $d1_{PZT}$, $d2_{PZT}$ and $w_{pol.}$ (see for example FIG. 1c, subfigure I) on figure page 1/5) may in realizations have the numerically same values albeit given in units in mm (millimeter) instead of μm (micrometer), more particularly:

$d1_{PZT}$=4 mm, $d2_{PZT}$=1.5 mm, and $w_{pol.}$=4.5 mm.

Additional layers may be added (such as added on top), such as for the purpose of improving the optical properties (such as said layers forming an anti-reflection coating) and/or improving resistance to, e.g., moisture (such as said layers forming a humidity barrier). The optical element, optionally with such additional layers, may be as described in the application WO2016009079 (A1) with the title "Piezoelectrically actuated optical lens", which application is hereby included by reference in entirety.

A structure element may be added, such as for the purpose of providing stress and thermal compensation and tuning mechanical strength and curvature of the optical element. The optical element, optionally with such structure element, may be as described in the application WO2016009078 (A1)

"A tunable microlens with a variable structure element", which application is hereby included by reference in entirety.

'Aperture' is used interchangeably with 'optical aperture' and is commonly known in the art, and is to be understood as such, in particular as an optically transparent aperture with respect to visible light. It is furthermore understood, that the optically transparent 'aperture' is delimited by an opaque material (such as opaque piezoelectric actuators), since an aperture is generally understood to be an opening that limits the quantity of light that can enter an optical instrument.

In an embodiment there is provided a optical lens, wherein said optical lens has an average (within a wavelength range and within the angle of incidence range) transmittance of 95% or more, such as 98% or more, such as 99% or more. An advantage of this may be that it facilitates that less light is lost when travelling through the optical device element. In general embodiments, said optical lens, has an average transmittance of 90% or more, such as 92% or more, such as 93% or more, such as 94% or more.

In an embodiment there is provided a optical lens, wherein
said optical lens, has an average (within a wavelength range and within the angle of incidence range) transmittance of 95% or more, such as 98% or more,
a minimum transmittance over the visible range (such as for any visible wavelength) is 94% or more, and/or wherein
an average reflectivity (such as wherein the wavelength range is confined to any visible wavelength) over the visible range is 2.5% or less, such as 1% or less.

In an embodiment there is presented an optical element, wherein the optical element is a reflective element, and wherein the bendable cover member is reflective on the side facing away from the support structure and/or on the side facing the support structure.

By 'reflective element' may be understood an element which reflects incident electromagnetic radiation, such as a mirror. By 'reflective' may be understood that the average (within a wavelength range and within the angle of incidence range) reflectivity is at least 90%, such as at least 95%, such as at least 99%, such as at least 99.9%. An advantage of reflective elements may be that they may suffer less from chromatic aberration compared to refractive optical elements. Another advantage of reflective elements may be that they can be relatively lighter than refractive optical components.

In an embodiment there is presented an optical element, wherein a total wavefront error ($WFE_{RMS}$) is equal to or less than 60 nm, such as 50 nm, such as 40 nm, such as 30 nm, such as nm, such as nm, throughout a range of 40 volts (such as 0-40 volts), such as a range of 100 volts (such as 0-100 volts), applied to the one or more piezoelectric actuators. By having total $WFE_{RMS}$ being lower than threshold throughout a range of another parameter, it may be understood that the total $WFE_{RMS}$ is lower than the threshold for any value of the other parameter in the given range. A possible advantage of this embodiment may be that an improved image quality may be achieved throughout a range of focal lengths.

By 'total wavefront error ($WFE_{RMS}$)' is understood the total root-mean-square (RMS) wavefront error ($WFE_{RMS}$), which is commonly known in the art and understood accordingly.

The total wave front error (WFE) is defined for a given conjugation (object and image points).

The wave front error is defined for each point of the light beam. It is the optical path difference between the actual (aberrated) wavefront and a perfect spherical wavefront. It is a distance usually expressed in nanometer (nm) or micrometer (µm).

The total $WFE_{RMS}$ is defined for a given conjugation (object and image points). It is the root mean square of the total WFE over a cross section of the light beam on the surface on which it is calculated, such as described in the formula below:

$$\text{Total WFE\_RMS} = \sqrt{1/A \iint_A (WFE(P))^2 dP}$$

The integral is made across the area A of the cross section of the output pupil of the system. The total $WFE_{RMS}$ is a single value. It is a distance, usually expressed in nanometer (nm) or micrometer (µm).

Measurement of total $WFE_{RMS}$ may be carried out using a wavefront measurement system with the Shack-Hartmann sensor, such as HASO™ from the company Imagine Optic (with headquarter address in Orsay, France).

In an embodiment there is presented an optical element, wherein a total wavefront error ($WFE_{RMS}$) is equal to or less than 60 nm, such as 50 nm, such as 40 nm, such as 30 nm, such as 25 nm, such as 20 nm, throughout a range of 5 diopters, such as throughout af range of 10 diopters, such as throughout a range of 13 diopters (such as [−3; +10] diopters), such as throughout a range of 28 diopters, such as throughout a range of 30 diopters (such as [−4; +26] diopters), such as throughout a range of 54 diopters (such as [−4; +50] diopters). A possible advantage of this embodiment may be that an improved image quality may be achieved throughout a range of focal lengths.

In an embodiment there is presented an optical element, wherein a total wavefront error ($WFE_{RMS}$) is equal to or less than 60 nm, such as 50 nm, such as 40 nm, such as 30 nm, such as 25 nm, such as 20 nm, throughout a range of focal lengths of [1/x; 1/(x+5 meter)], such as throughout af range of focal lengths of [1/x; 1/(x+10 meter)], such as throughout a range of focal lengths of [1/x; 1/(x+13 meter)], such as throughout a range of focal lengths of [−⅓ meter⁻1; +⅒ meter⁻¹], such as throughout a range of focal lengths of [−¼ meter-1; +1/26 meter-1], such as throughout a range of focal lengths of [−¼ meter-1; +1/50 meter-1], where x is an arbitrarily chosen length. In embodiments, x may be −3 m or 0 m.

In an embodiment there is presented an optical element, wherein the optically active area corresponds to (such as be identical with) the optical aperture, such as wherein the one or more piezoelectric actuators may be defining the optically active area, such as wherein the optical element is an optical lens and where an optical aperture of the at least one deformable lens body on the bendable cover member is encircled by the one or more piezoelectric actuators being.

In an embodiment there is presented an optical element, wherein the bendable cover member (102, 502, 702) is glass, such as any type of glass, such as glass with a Young's modulus within 20-60 GPa.

In an embodiment there is presented an optical element, wherein the total wavefront error ($WFE_{RMS}$) is measured at 630 nm, such as at a wavelength of 630 nm and at an angle of incidence of 0°.

In an embodiment there is presented an optical element, wherein a maximum total wavefront error (WFE$_{RMS}$) throughout a range of 40 volts (such as 0-40 volts), such as a range of 100 volts (such as 0-100 volts), applied to one or more piezoelectric actuators for a corresponding optical element where the first and second lines do not cross or are parallel and coincident at one or more positions, such as wherein the first line is completely inside or completely outside of the second line, is at least 10% larger, such as 20% larger, such as 30% larger, such as 40% larger, such as 50% larger, such as 100% larger, such as 250% larger, than a maximum total wavefront error (WFE$_{RMS}$) throughout a range of 40 volts (such as 0-40 volts), such as a range of 100 volts (such as 0-100 volts), applied to the one or more piezoelectric actuators for the optical element wherein the first line and the second line as observed in the direction being parallel with the optical axis cross each other at two or more positions and/or are parallel and coincident at one or more positions.

According to this embodiment, there is provided an optical lens (wherein the first line and the second line as observed in the direction being parallel with the optical axis cross each other and/or are parallel and coincident in at least one position) which has a lower total WFE$_{RMS}$ than an optical lens (referred to as 'corresponding optical lens') which is identically similar except that the first and second lines do not cross or are parallel and coincident in at least one position. Thus, according to this embodiment, the optical lens is arranged so that the arrangement of the one or more piezoelectric actuators makes a difference with respect to the total WFE$_{RMS}$, and the one or more piezoelectric actuators are arranged so that the first line and the second line as observed in the direction being parallel with the optical axis cross each other and/or are parallel and coincident in at least one position and so that the WFE$_{RMS}$ is thereby reduced.

In an embodiment there is presented an optical element, wherein the inner edge of the support structure defines an opening for which a circumscribing rectangle or square would have a minimum side-length being equal to or larger than 2.5 mm, such as equal to or larger than 2.8 mm, such as equal to or larger than 3.0 mm, such as equal to or larger than 3.5 mm, such as equal to or larger than 3.8 mm, such as equal to or larger than 4.0 mm, such as equal to or larger than 4.5 mm, such as 5 mm, such as 10 mm. By 'the inner edge of the support structure' may be understood the inner edge of the support structure at the interface between the support structure and the bendable cover member. It may be understood that both the inner edge of the support structure and the circumscribing rectangle are to be observed in a plane being orthogonal to the optical axis.

In an embodiment there is presented an optical element, wherein a thickness of the optical element is equal to or less than 1 mm, such as equal to or less than 700 micrometer, such as equal to or less than 500 micrometer, such as equal to or less than 450 micrometer, such as equal to or less than 425 micrometer, such as equal to or less than 400 micrometer. A possible advantage of having a small thickness is that it enables an optical lens with a very small vertical footprint. This small vertical footprint may in turn optionally allows thinner optical devices, such as cameras, with smaller vertical footprint that can then be integrated into thinner devices, such as mobile phones, than presently allowed today. By 'thickness of the optical lens' may be understood the dimension of the optical length in a direction parallel with the optical axis (such as the distance between two planes being orthogonal with respect to the optical axis and being placed on either side of the optical lens). In an embodiment there is provided an optical element being an optical lens, wherein said thickness corresponds to a distance from a plane being orthogonal to the optical axis and comprising whichever of the following points which is furthest away from the cover member (such as wherein said point is on an opposite side of the cover member with respect to the piezoelectric actuators):

the point on the support structure furthest away from the cover member, or the point on the lens body (or a back window on the lens body) furthest away from the cover member, to a plane being orthogonal to the optical axis and comprising the point on the one or more piezoelectric actuators (optionally including an electric contact element), which is furthest away from the cover member.

In an embodiment there is presented an optical element, wherein the inner edge of the support structure defines an opening for which a circumscribing square or circumscribing rectangle may be provided and wherein the first line and the second line as observed in the direction being parallel with the optical axis cross or are parallel and coincident at a position, for which a distance from a. the middle of a nearest side of the circumscribing square or of the circumscribing rectangle to b. a projection of said position onto the nearest side of the circumscribing square or of the circumscribing rectangle, is within a range of [10; 90] % of half the sidelength of the circumscribing square or of the circumscribing rectangle, such as within a range of [15; 85] %, such as within a range of [20; 80] %, such as within a range of [25; 75] %, such as within a range of [30; 70] %, such as within a range of [40; 60] %, such as within a range of [45; 60] %, such as within a range of [50; 55] %, of half the sidelength of the circumscribing square or of the circumscribing rectangle. A possible advantage of this embodiment may be that it enables achieving a particularly average total WFE$_{RMS}$, such as a particular average total WFE$_{RMS}$, such as a relatively small (or minimal) total WFE$_{RMS}$ (such as where "relatively" is with respect to an average total WFE$_{RMS}$ in case of a corresponding optical element where said distance is outside of said range), throughout a range of diopters of the optical lens.

In an embodiment there is presented an optical element, wherein the one or more piezoelectric actuators are defining the optically active area, such as being arranged so as to surround or encircle the optically active area. In an embodiment there is presented an optical element being an optical lens, wherein the optical axis intersects the deformable transparent lens body and the cover member. In an embodiment there is presented an optical element being an optical lens, wherein said at least one deformable transparent lens body comprises polymer, such as solid polymer, such as a deformable transparent lens body consisting of solid polymer. By said at least one deformable transparent lens body comprises polymer, such as solid polymer, may be understood that said at least one deformable transparent lens body comprises at least 10 wt % (weight percent), such as at least 25 wt %, such as at least 50 wt %, such as at least 75 wt %, solid polymer. In an embodiment there is presented an optical element being an optical lens, wherein said at least one deformable transparent lens body comprises a polymer network of cross-linked or partly cross-linked polymers and a miscible oil or combination of oils. In an embodiment there is presented an optical element being an optical lens, wherein said at least one deformable transparent lens body may have an elastic modulus larger than 300 Pa, a refractive index is above 1.35, and an absorbance in the visible range less than 10% per millimeter thickness.

In an embodiment there is presented an optical element, wherein a diameter of the optically active area, such as the optical aperture, is 10 mm or less, such as 7.5 mm or less, such as 5 mm or less (such as [0.5; 4.0] mm), such as 2.5 mm or less (such as [2.0-2.4] mm), such as 1.9 mm or less, such as 1.55 mm or less, such as 1 mm or less. A possible advantage of having a small diameter is that it enables providing an optical lens, which may utilise very little area in a final application device (such as a camera) and/or where the small size facilitates that it can be installed in multiple positions for additional functionality (e.g. 3D imaging).

In an embodiment there is presented an optical element, wherein a diameter of the optically active area is 1 mm or more, such as 1.55 mm or more, such as 1.9 mm or more, such as 2 mm or more, such as 2.5 mm or more. A possible advantage of having a large diameter is that it enables providing a large amount of light.

In an embodiment there is presented an optical element, wherein the one or more piezoelectric actuators and the bendable cover member are arranged so that the one or more piezoelectric actuators upon actuation directly deforms the bendable cover member, such as throughout a range of 5 diopters, such as throughout of range of 10 diopters, such as throughout a range of 13 diopters, such as throughout a range of [−3; +10] diopters), such as throughout a range of 28 diopters, such as throughout a range of 30 diopters (such as [−4; +26] diopters), such as throughout a range of 54 diopters (such as [−4; +50] diopters). By 'directly' may be understood, that the one or more actuators are arranged with respect to the bendable cover member, so that the deformation of the bendable cover member is not dependent on a third element, such as an incompressible element (such as a fluid), as is for example the case in the reference US 2010/182703 A1, which is hereby incorporated by reference in entirety.

In an embodiment there is presented an optical element, wherein the bendable cover member extends beyond the inner edges of the sidewall. It is to be understood, that the inner edges of the sidewall correspond to the surface of the sidewall, such as the surface of the sidewall facing the deformable lens body in the case of the optical element being an optical lens. In other words, the bendable cover member extends further away from the optical axis than the surface of the sidewall facing, such as the surface of the sidewall facing the optical axis (and optionally the deformable lens body). A possible advantage of this is that it enables that the one or more piezoelectric actuators may be arranged so as to utilize a cantilever principle thereby amplifying the maximal radius of curvature, even in the optically active area, such as the aperture, where no actuators are present.

In an embodiment there is presented an optical element, wherein the bendable cover member comprises, such as consists of, a material having a youngs modules of at least 10 GPa, such as within 10-100 GPa, such as within 20-60 GPa. An advantage of this (such as a relatively rigid cover member) may be that it enables or facilitates that the one or more piezoelectric actuators are defining the optically active area, such as the aperture, while it is still possible to shape the cover member in the optically active area, such as the aperture (although no piezoelectric actuators are there) with the one or more piezoelectric actuators.

The bendable cover member may (in case of the optical element being an optical lens) be a bendable transparent cover member, and may more particularly
  have a transmittance of 98% or more for light, and/or
  a stress less than or equal to 20 MPa.

This may for example be realized if the bendable transparent cover member is made of glass.

In an embodiment there is presented an optical element, wherein the one or more piezoelectric actuators comprise a material with
  a transverse piezo coefficient (|d31|) being numerically equal to or larger than 20 pC/N, such as preferably numerically equal to or larger than 50 pC/N, such as preferably numerically equal to or larger than 100 pC/N, such as being negative and numerically equal to or larger than 100 pC/N, such as preferably numerically equal to or larger than 200 pC/N,
and/or
  a longitudinal piezo coefficient (|d33|) being numerically equal to or larger than 20 pC/N, such as preferably numerically equal to or larger than 50 pC/N, such as being numerically equal to or larger than 100 pC/N, such as being positive and numerically equal to or larger than 100 pC/N, such as being numerically equal to or larger than preferably <200 pC/N.

By 'numerically' is understood the absolute value, e.g., −250 is numerically larger than any number in the range] |250; +250[. In an embodiment, the material is chosen to be a ferroelectric material, such as lead zirconate titanate (PZT). An advantage of this may be the large piezoelectric actuation effect of this material.

In an embodiment there is presented an optical lens, wherein the magnification is tunable by means of actuation of the one or more piezoelectric actuators throughout a range spanning more than 2 diopters, such as 3 diopters or more, such as 4 diopters or more, such as 5 diopters or more, such as 6 diopters or more, such as 7.5 diopters or more, such as 10 diopters or more, such as 12.5 diopters or more, such as 14 diopters or more, such as 16 diopters or more, such as 20 diopters or more, such as through a range of [−10; +20] diopters, such as throughout a range of 28 diopters, such as throughout a range of 30 diopters (such as [−4; +26] diopters), such as throughout a range of 54 diopters (such as [−4; +50] diopters). It may in general be understood, that the range spanned may include a magnification of 0 diopters, such as a range spanning 0-5 diopters, such as 0-6 diopters or more, such as 0-7.5 diopters or more, such as 0-10 diopters or more, such as 0-12.5 diopters or more, such as 0-14 diopters, such as 0-16 diopters, such as 0-20 diopters, such as throughout a range of 28 diopters, such as throughout a range of 30 diopters (such as [−4; +26] diopters), such as throughout a range of 54 diopters (such as [−4; +50] diopters). The range spanned may include a magnification of 0 diopters and a range on both sides of zero, such as a range from/to ±2.5 diopters (i.e., from −2.5 diopters to 2.5 diopters), such as ±6 diopters or more, such as ±7.5 diopters or more, such as ±10 diopters or more, such as ±12.5 diopters or more, such as ±14 diopters, such as ±16 diopters, such as ±20 diopters, such as [−4; +26] diopters, such as [−4; +50] diopters.

According to a second aspect of the invention, there is presented a method for manufacturing an optical element according to any one of the preceding claims, said method comprising:
  Providing the one or more piezoelectric actuators on the bendable cover member by deposition.

A possible advantage of this embodiment may be that the inventive optical lens employs a relationship between the first and second lines, and that this relationship may be fulfilled by implementing a certain shape of the second line, and that this shape may be realized by merely implementing an appropriate deposition mask and/or an appropriate etching mask during manufacturing.

According to a third aspect, there is provided a camera comprising
  a. an optical element according to the first aspect, or
  b. An optical element as manufactured according to the second aspect.

In a more general embodiment, there is provided an optical device comprising
  a. an optical element according to the first aspect, or
  b. an optical element as manufactured according to the second aspect,
wherein the optical device may be any one optical device chosen from the group comprising, such as consisting of: a scanner, a camera, a variable optical tuner or attenuator, an iris, an optical image stabilisation (OIS) unit, a zoom lens, a wide angle lens, bar code reader, endoscope, projector or any device in which light is organised to create a desired effect (e.g. imaging).

According to a fourth aspect of the invention, there is provided use of
  a. an optical element according to the first aspect, or
  b. an optical element as manufactured according to the second aspect, for obtaining one or more images.

In alternative embodiments, the optical element referred to, may be use for scanning identification marks, such as barcodes and/or retinas, or attenuating light of specific wavelengths.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The optical element, method, optical device and use according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

In general, when a direction is implied, such as when using the terms 'above' or 'below' or 'top' or 'bottom', it is in general understood that a positive direction is defined in a direction parallel to the optical axis from the support structure to the cover member. For example, the cover member is above the support structure such as on top of the support structure.

Figure 1:
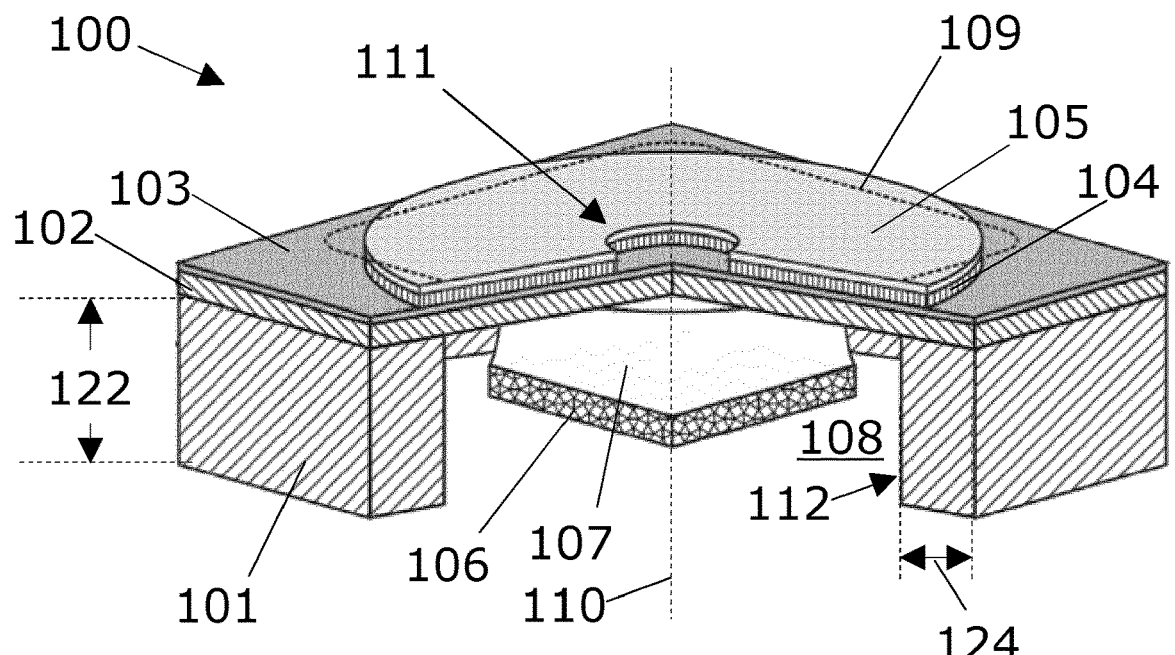
FIG. 1 is a perspective drawing of an optical lens according to an embodiment.

FIG. 1 is a perspective drawing of an optical element, and more particularly an optical lens according to an embodiment, more particularly a support structure 101 (with a sidewall 112 facing the optical axis 110) which has a thickness 122 in the range 200-800 micrometer and a width 124 in the range 100-500 micrometer, a bendable transparent cover member 102 (which in the present embodiment is glass), a bottom electrode 103 (for the one or more piezoelectric actuators), a piezoelectrically active material 104, a top electrode 105 (for the one or more piezoelectric actuators). It may be understood, that the position of the one or more piezoelectric actuators as observed in a top-view (along a direction parallel with the optical axis) is defined as positions wherein there is an overlap between all of the bottom electrode 103, the piezoelectrically active layer 104 and the top electrode 105 (note that only in these positions can the piezoelectrically active layer be actuated). The figure furthermore shows a transparent deformable lens body 107 (which in the present embodiment is a polymer), a transparent back window 106 (placed on the lens body 107), a cavity 108 inside the support structure 101 (which cavity 108 comprises the optical axis 110 and is bounded in a direction away from the optical axis 110 by the sidewall 112), an inner edge 109 of the support structure 101 (at the interface between the support structure 101 and the bendable transparent cover member 102) projected to the surface of the bottom electrode 103 or to the surface of the top electrode 105. In the presently shown embodiment, it can be seen that an outer edge of the one or more piezoelectric actuators 103, 104, 105 (which in the present embodiment is a single piezolectric actuator, which—although it cannot be seen due to the cut-away portion—forms a closed ring completely encircling the optical axis 110 and optical aperture 111) as observed in a direction being parallel with the optical axis defines a first line, and an inner edge 109 of the support structure at the interface between the support structure 101 and the bendable transparent cover member 102 as observed in the direction being parallel with the optical axis defines a second line, wherein the first line and the second line as observed in the direction being parallel with the optical axis cross each other in 8 positions (of which only 6 positions are shown, but where the last two are placed in the cut-away portion).

Figure 2:
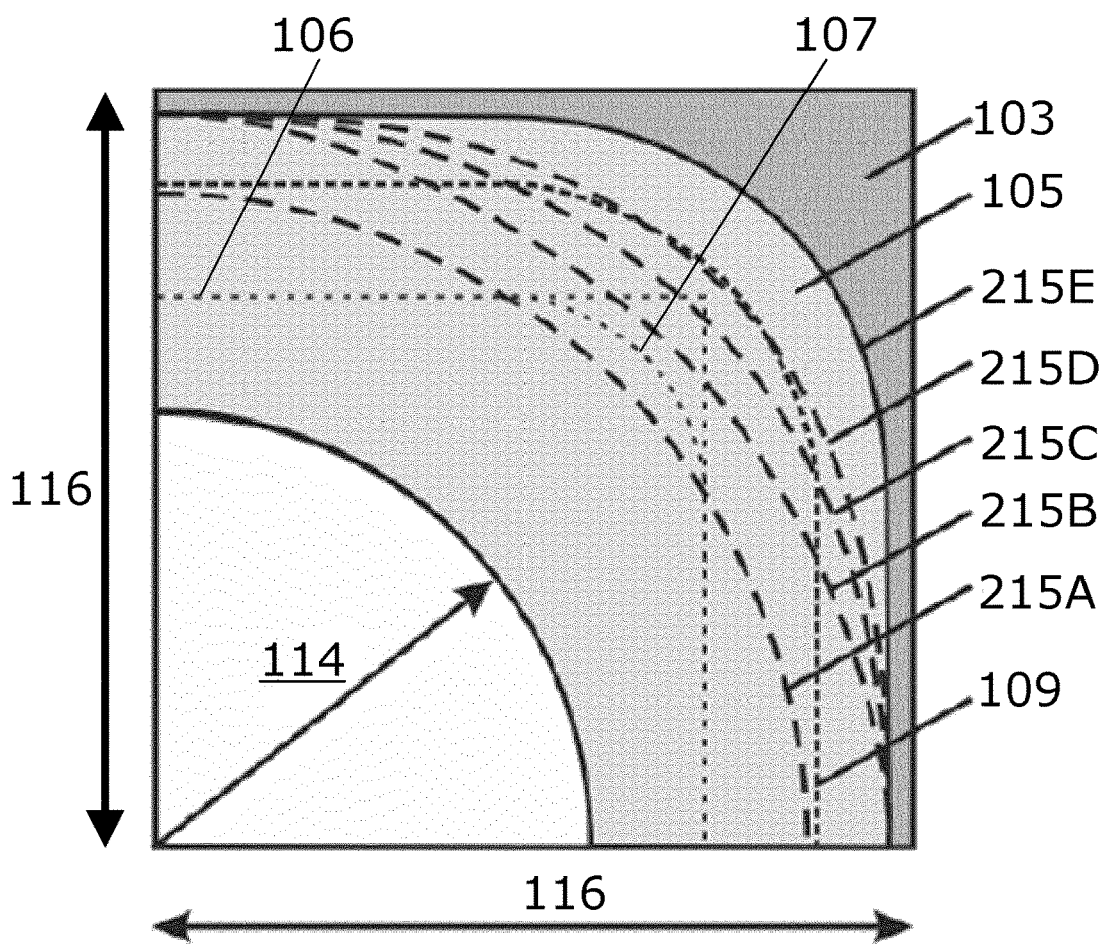
FIG. 2 is a top-view schematic of a plurality of embodiments.

FIG. 2 is a top-view schematic of an example (example E) and furthermore indicates a plurality of embodiments (embodiments B, C and D) and another example (example A). The figure (similarly to FIGS. 8-20) shows a quarter of an optical element and a quarter of an optical aperture (with radius 114 being 1.05 mm) and wherein the total width (corresponding to twice the half-width 116) is 3.7 mm (with the optical axis intersecting the lower left corner in a direction orthogonal to the plane of the paper, and the remaining three quarters being identical albeit rotated 90°, 180° and 270° around the optical axis). Some features of FIG. 2 (similarly to FIGS. 8-20) corresponds to a top-view of the perspective drawing in FIG. 1, such as the bottom electrode 103 (not visible in FIGS. 18-20), the inner edge 109 of the support structure, an outline of the position of the lens body 107, an outline of the position of the transparent back window 106. FIG. 2 (similarly to FIGS. 18-20) furthermore shows a plurality of different possible first lines (as indicated by the full drawn line showing outer edge 215E and the dashed lines indicating outer edges 215A-D). The half-width 116 may be taken as a scalebar and it is furthermore noted that the excerpt is as high as it is wide, thus the figure is showing accurate dimensions.

In the depicted example E, the top electrode 105 is coincident with the piezoelectrically active layer and the outer edge 215E of the top electrode 105 is also coincident with the first line. The figure shows that the outer edge 215E neither crosses nor is parallel and coincident with the second line 109 at any position (it is completely outside, such as outside a region encircled by the second line).

The figure indicates (via dashed lines 215A-D) other possible scenarios for the top electrode 105 (and the piezoelectrically active layer) and the first line.

In the indicated (via dashed line A) example A, the top electrode is coincident with the piezoelectrically active layer and the outer edge 215A of the top electrode is also coincident with the first line. The figure shows that the outer edge 215A neither crosses nor is parallel and coincident with the second line 109 at any position (it is completely inside).

In the indicated (via dashed lines B and C) embodiments B and C, the top electrode is coincident with the piezoelectrically active layer and the outer edges 215B and 215C of the top electrode is also coincident with the first line. The FIG. shows that the outer edges 215B and 215C each crosses the second line 109 at two positions (it is both inside and outside) in the quarter, i.e., at 8 positions in total.

In the indicated (via dashed line D) embodiment D, the top electrode is coincident with the piezoelectrically active layer and the outer edge 215D of the top electrode is also coincident with the first line. The figure shows that the outer edge 215D is parallel and coincident with the second line 109 at one position (it is otherwise completely outside) in the quarter (namely in the corner), i.e., at 4 positions in total. Remaining first line (such as first line which is not parallel and coincident with the second line) is outside a region encircled by the second line.

It can also be seen that the inner edge 109 of the support structure defines an opening for which a circumscribing square may be provided and wherein the first line and the second line as observed in the direction being parallel with the optical axis cross or are parallel and coincident at a position, for which a distance from
a. the middle of a nearest side of the circumscribing square
to
b. a projection of said position onto the nearest side of the circumscribing square,
is 43% (embodiment B), 54% (embodiment C) and 85% (embodiment D) of half the sidelength of the circumscribing square for the three embodiments.

Figure 3:
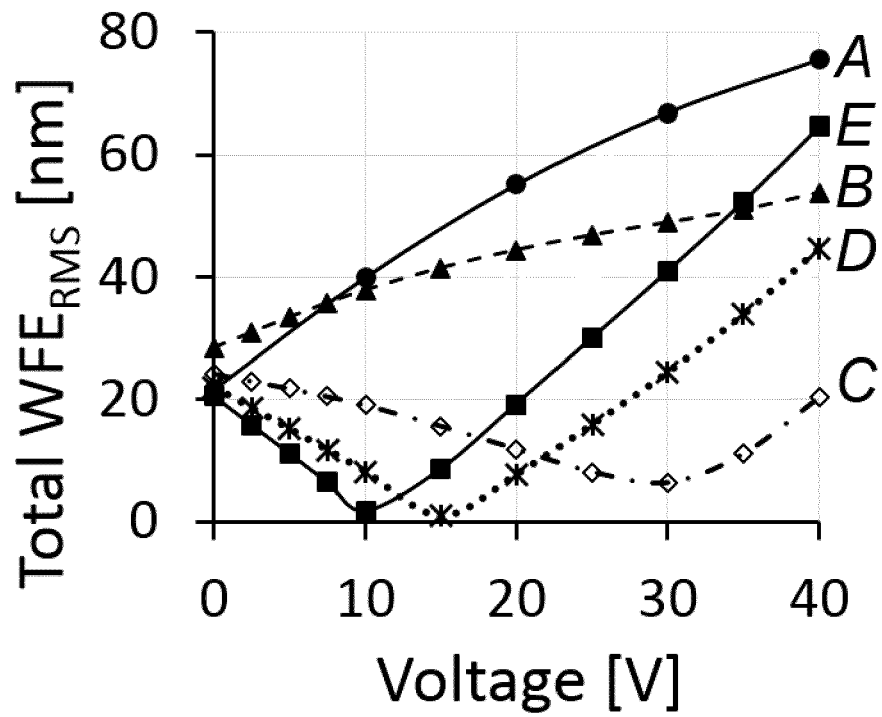
FIG. 3 is a graph showing total $WFE_{RMS}$ for the plurality of embodiments.

FIG. 3 is a graph with simulation data showing total $WFE_{RMS}$ (range 0-80 nm) as a function of voltage applied on the one or more piezoresistive actuators (range 0-40 volts) for examples A and E and for embodiments B-D as depicted in FIG. 2.

More particularly for example A (full drawn curve with filled circles as markers), embodiment B (dashed line with filled triangles as markers), embodiment C (dashed-dotted line with open diamonds as markers), embodiment D (dotted line with crosses as markers) and example E (full drawn line with filled squares as markers). The figure shows that while all curves exhibit low values of $WFE_{RMS}$ at some points, only embodiments B-D remain below 60 nm throughout the depicted range.

Figure 4:
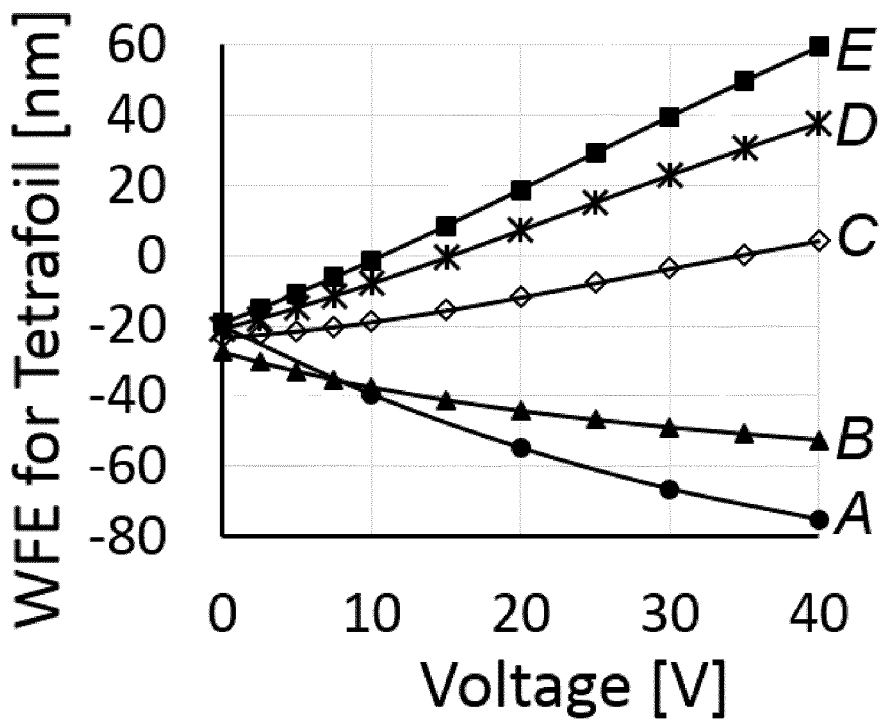
FIG. 4 is a graph showing tetrafoil WFE for the plurality of embodiments.

FIG. 4 is a graph with simulation data showing tetrafoil WFE (range −80 nm to +60 nm) as a function of voltage applied on the one or more piezoresistive actuators (range 0-40 volts) for examples A and E and for embodiments B-D as depicted in FIG. 2. More particularly for example A (full drawn curve with filled circles as markers), embodiment B (full drawn curve with filled triangles as markers), embodiment C (full drawn curve with open diamonds as markers), embodiment D (full drawn curve with crosses as markers) and example E (full drawn line with filled squares as markers). The figure shows all embodiments B-D remain below (in absolute terms) the examples A and E throughout the range 10-40 volts. The low contribution to the tetrafoil WFE may at least partially explain why the inventive embodiments yield low total $WFE_{RMS}$.

Figure 5:
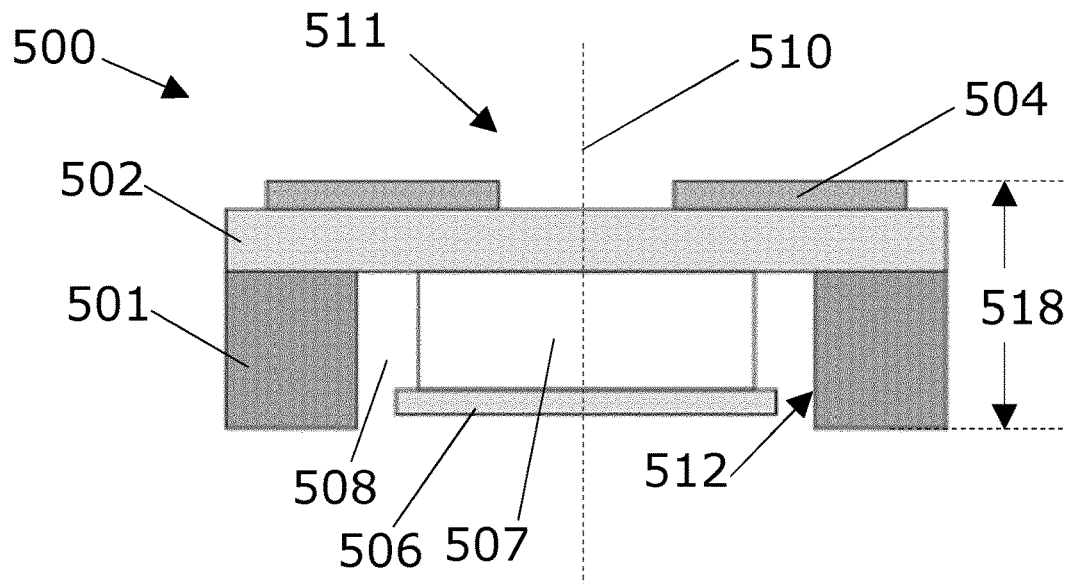
FIGS. 5-6 are side-view drawings of embodiments with an optical lens.
Figure 6:
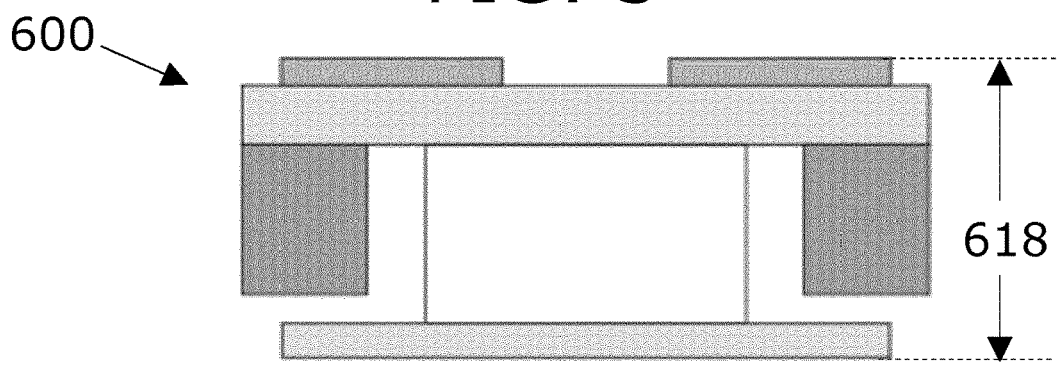

FIGS. 5-6 are side-view drawings of embodiment 500, 600 with an optical lens, comprising a support structure 501 (with a sidewall 512 facing the optical axis 510), a bendable transparent cover member 502, a piezoelectric actuator 504, a transparent deformable lens body 507, a transparent back window 506, a cavity 508 inside the support structure 501, an optical axis 510 and an optical aperture 511.

In FIG. 5 the thickness 518 corresponds to a distance from
the point on the support structure furthest away from the cover member,
to
the point on the one or more piezoelectric actuators (optionally including an electric contact element), which is furthest away from the cover member.

In FIG. 6 the thickness 618 corresponds to a distance from
the point on the lens body (or a back window on the lens body) furthest away from the cover member,
to
the point on the one or more piezoelectric actuators (optionally including an electric contact element), which is furthest away from the cover member.

Figure 7:
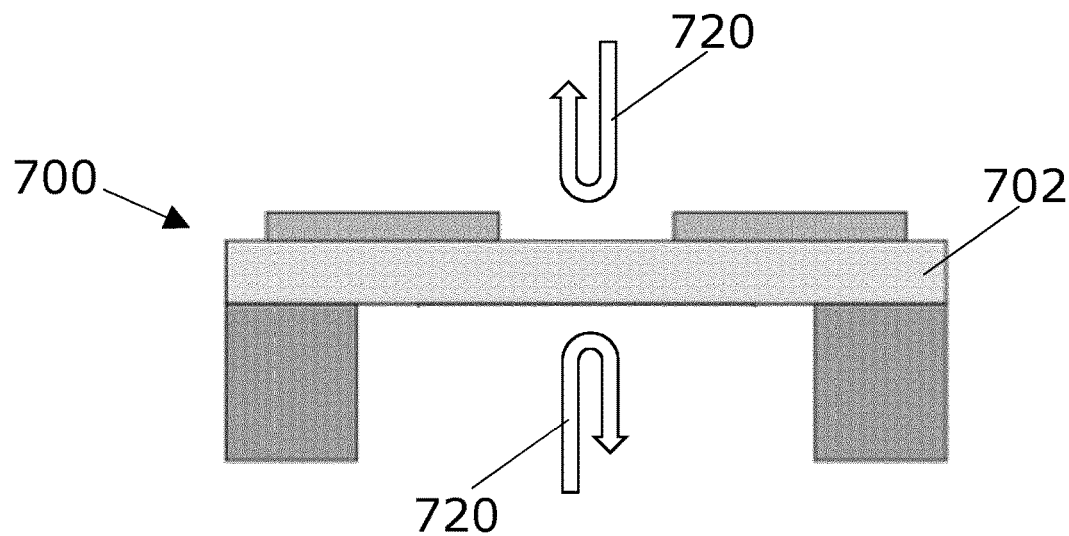
FIG. 7 is a side-view drawing of an embodiment with a reflective element.

FIG. 7 is a side-view drawing of an embodiment 700 with a reflective element. The reflective embodiment 700 is similar to embodiments 500, 600 depicted in FIGS. 5-6, except that there is no lens body and no back window and that the cover member 702 is reflective on one or both sides (such as an upper and/or a lower side) so that light 720 may be reflected from one or both sides.

In each of FIGS. 8-20, any dimension given (where it is noted that numbers for dimensions in the figure which are given without units are given in millimetres) may be taken as a scalebar and it is furthermore noted that each figure excerpt is as high as it is wide, thus the figure is showing accurate dimensions.

Figure 8:
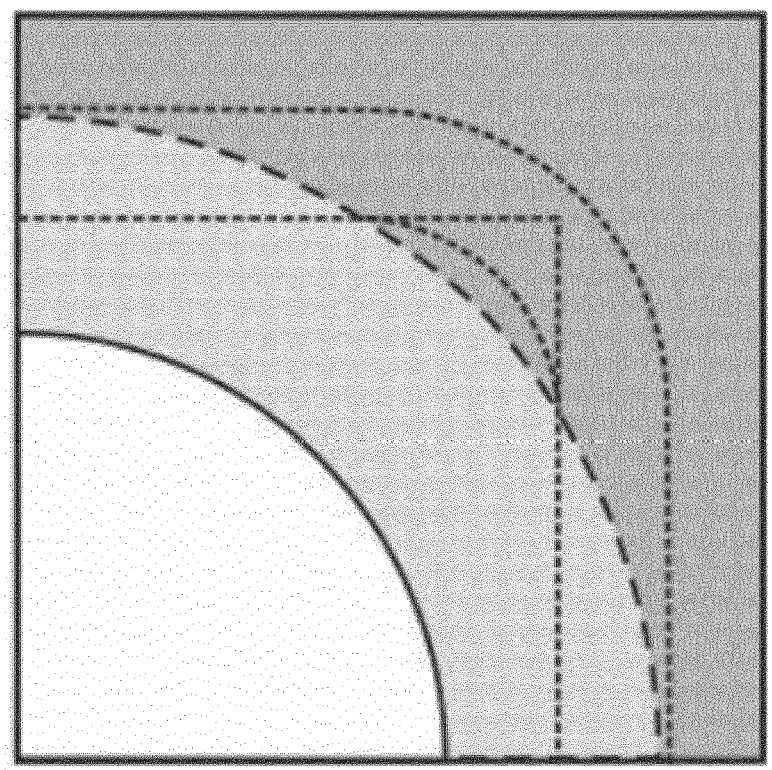
FIG. 8 is a top-view schematic of example A.

FIG. 8 is a top-view schematic of example A, similar to FIG. 2, except showing only example A.

Figure 9:
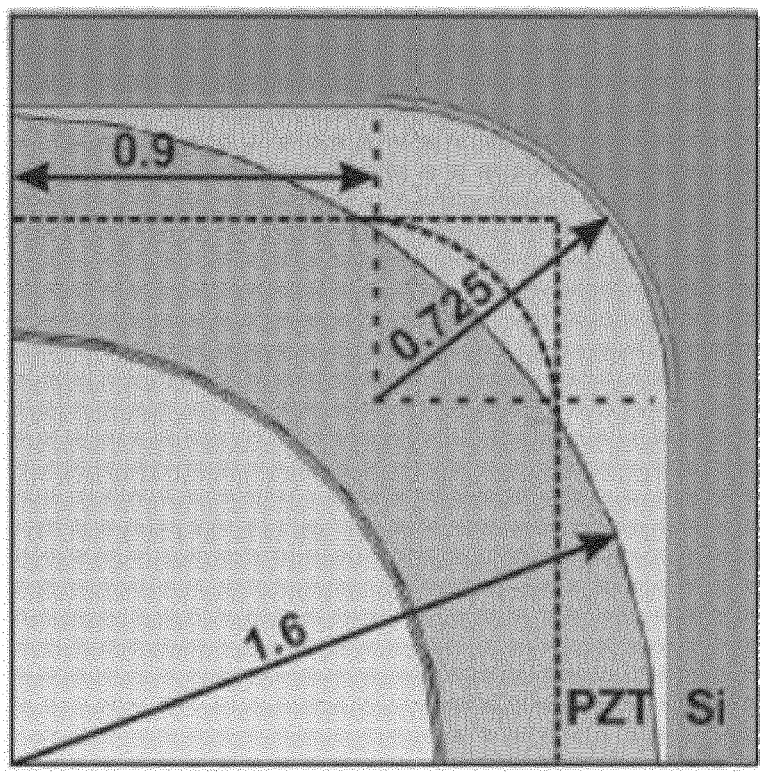
FIG. 9 is a top-view schematic of example A with dimensions indicated.

FIG. 9 is a top-view schematic of example A with dimensions indicated. The figure shows that the first line of example A is circular with diameter 1.6 mm.

Figure 10:
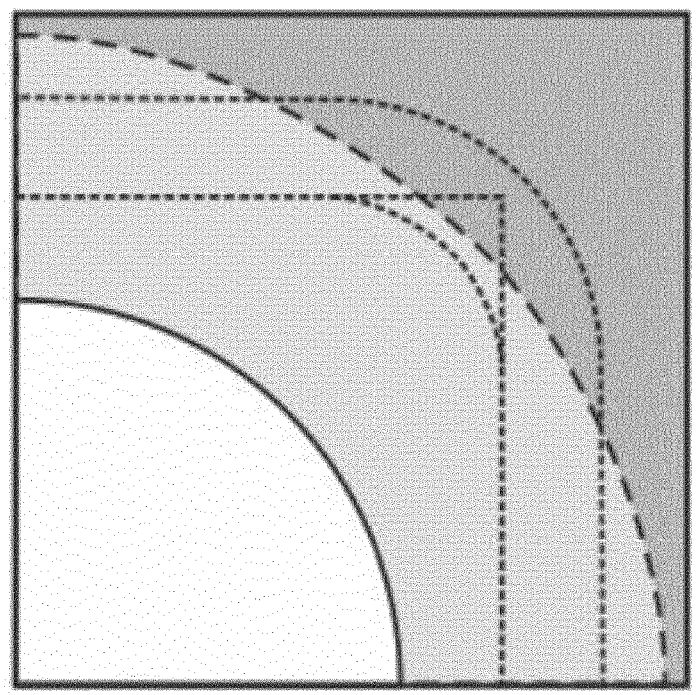
FIG. 10 is a top-view schematic of embodiment B.

FIG. 10 is a top-view schematic of embodiment B, similar to FIG. 2, except showing only embodiment B.

Figure 11:
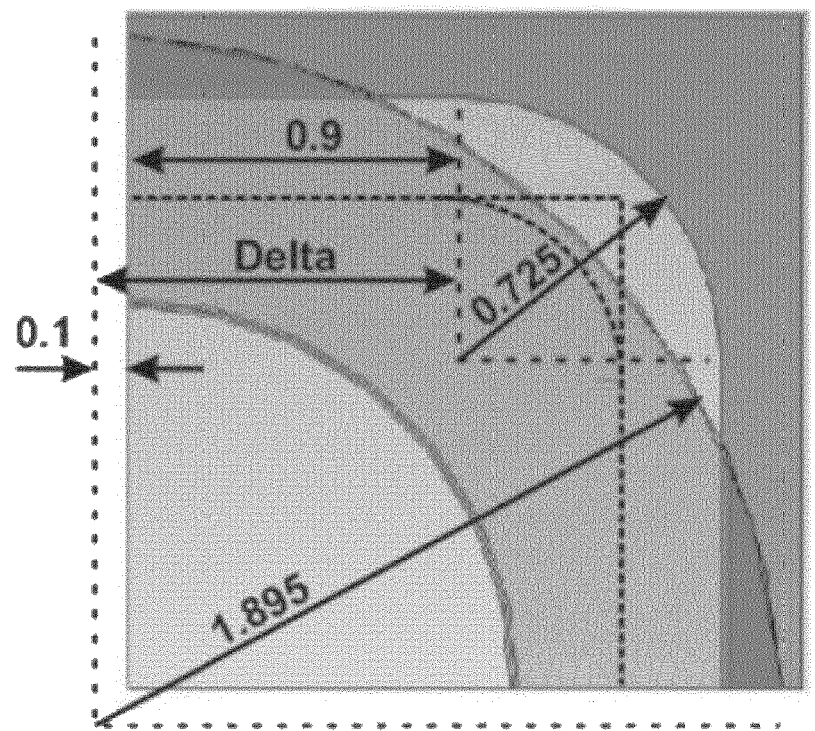
FIG. 11 is a top-view schematic of embodiment B with dimensions indicated.

FIG. 11 is a top-view schematic of embodiment B with dimensions indicated. The figure shows that the first line of embodiment B is circular with diameter 1.895 mm.

Figure 12:
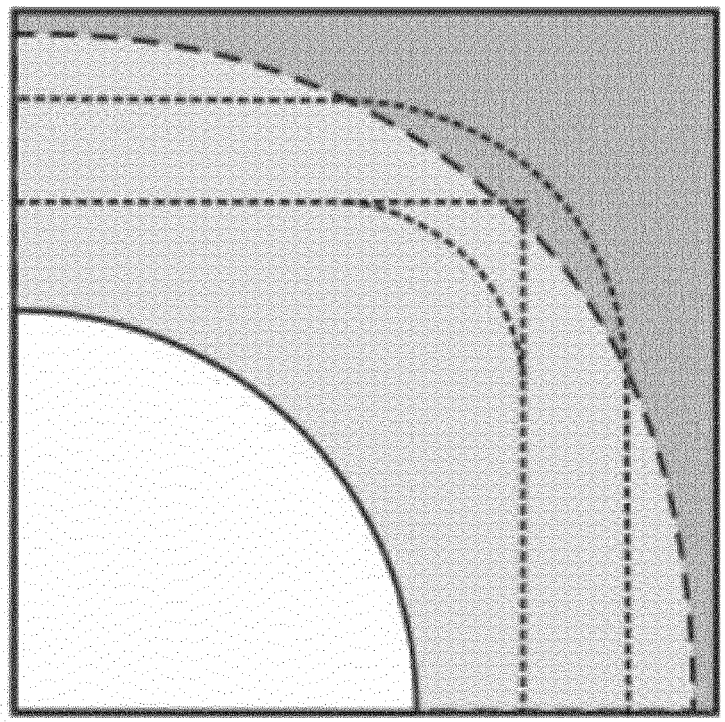
FIG. 12 is a top-view schematic of embodiment C.

FIG. 12 is a top-view schematic of embodiment C, similar to FIG. 2, except showing only embodiment C.

Figure 13:
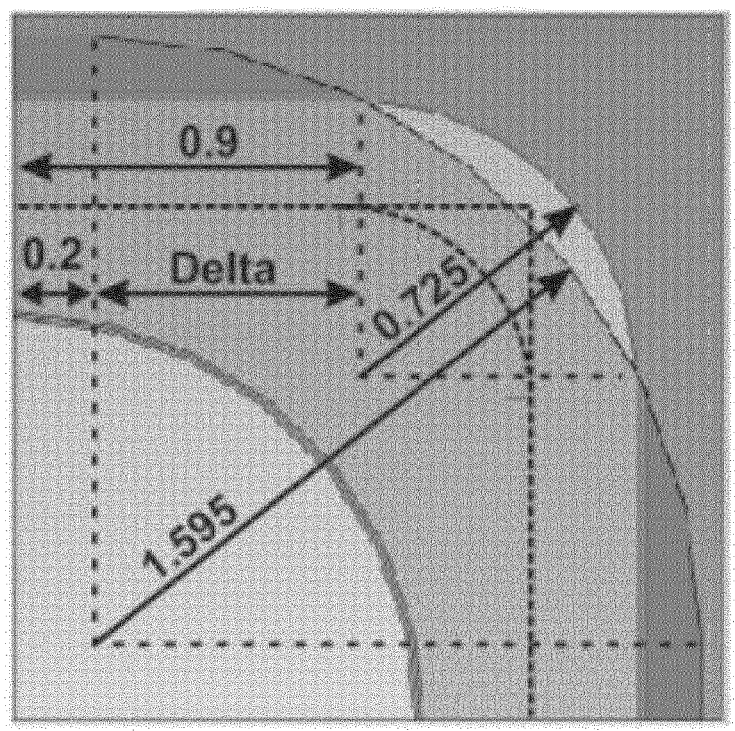
FIG. 13 is a top-view schematic of embodiment C with dimensions indicated.

FIG. 13 is a top-view schematic of embodiment C with dimensions indicated. The figure shows that the first line of embodiment C is a square with circularly rounded corners.

Figure 14:
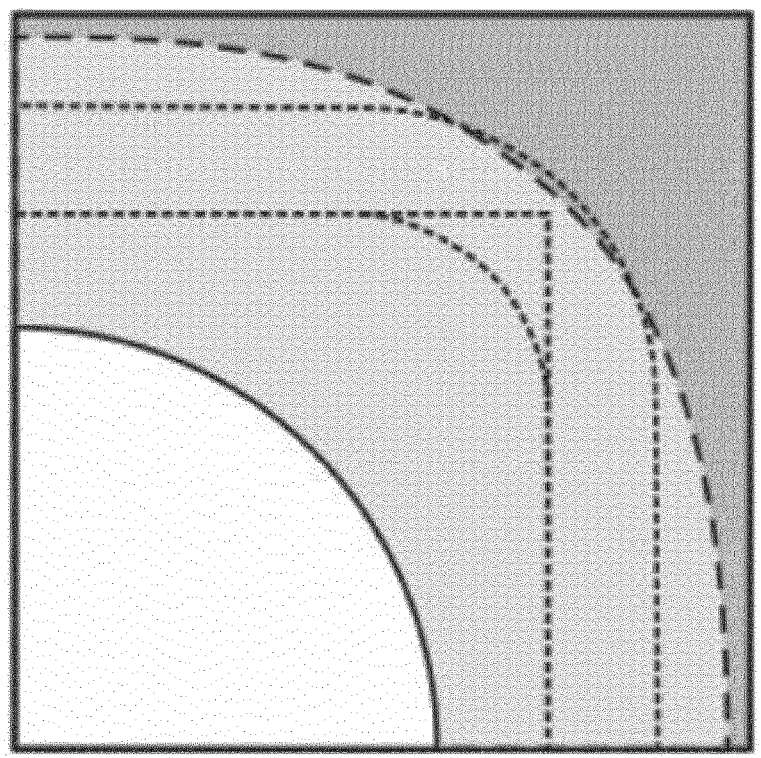
FIG. 14 is a top-view schematic of embodiment D.

FIG. 14 is a top-view schematic of embodiment D, similar to FIG. 2, except showing only embodiment D.

Figure 15:
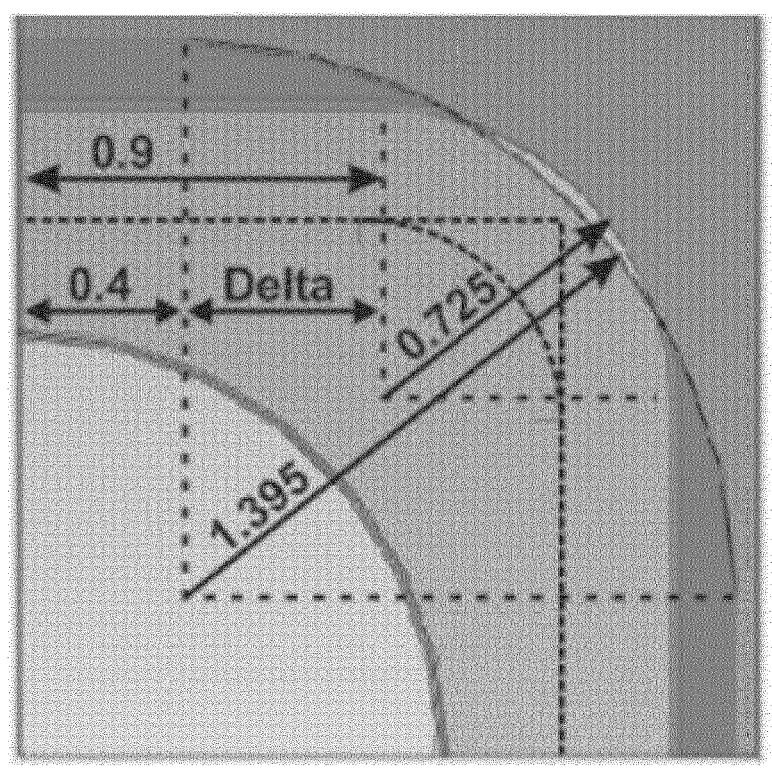
FIG. 15 is a top-view schematic of embodiment D with dimensions indicated.

FIG. 15 is a top-view schematic of embodiment D with dimensions indicated. The figure shows that the first line of embodiment D is a square with circularly rounded corners.

Figure 16:
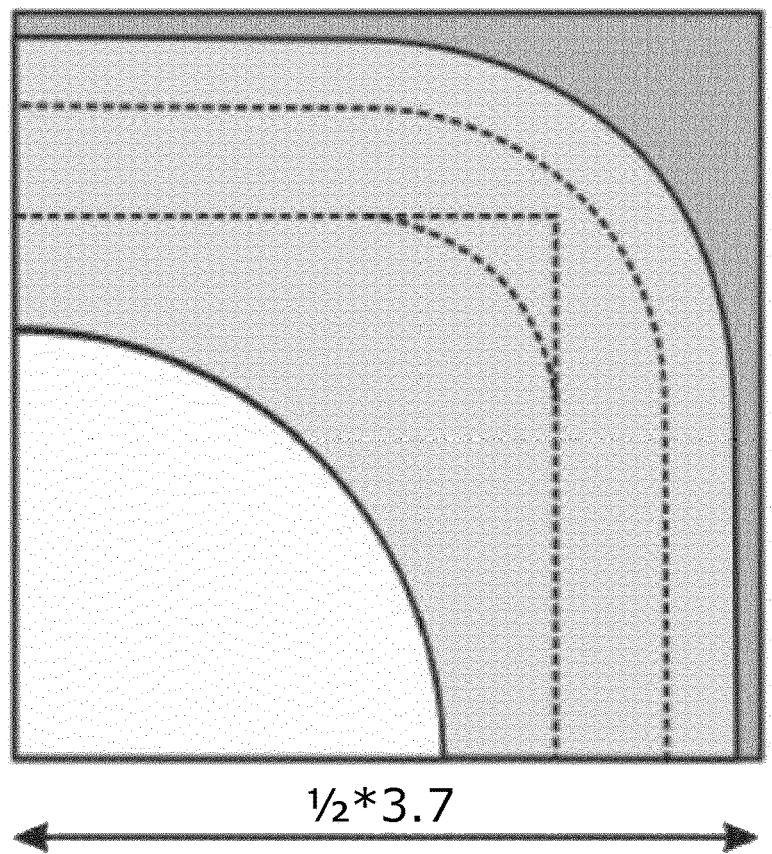
FIG. 16 is a top-view schematic of example E.

FIG. 16 is a top-view schematic of example E, similar to FIG. 2, except showing only example E.

Figure 17:
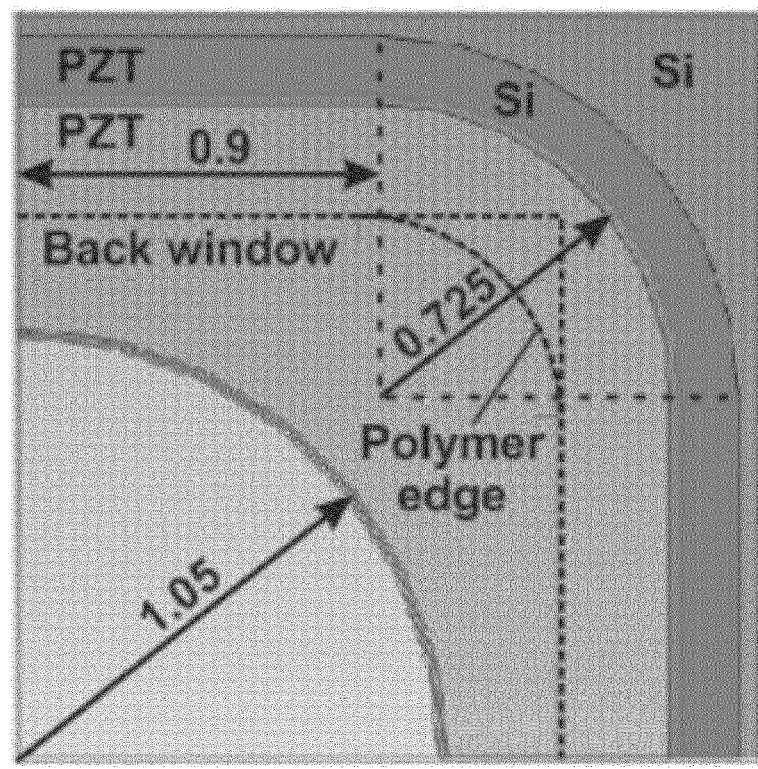
FIG. 17 is a top-view schematic of example E with dimensions indicated.

FIG. 17 is a top-view schematic of example E with dimensions indicated.

Figure 18:
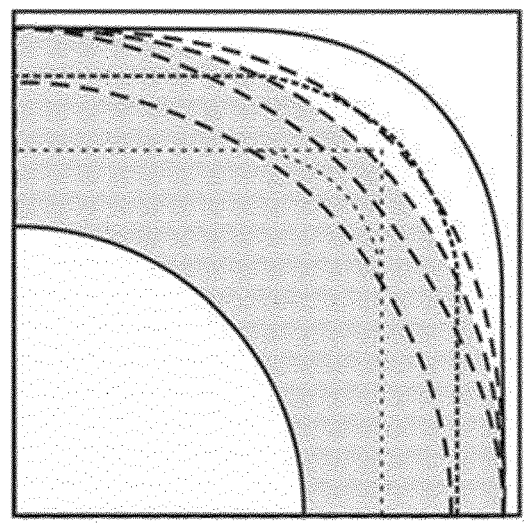
FIG. 18 is a top-view schematic of a modification of embodiment C.

FIG. 18 is a top-view schematic of a modification of embodiment C.

Figure 19:
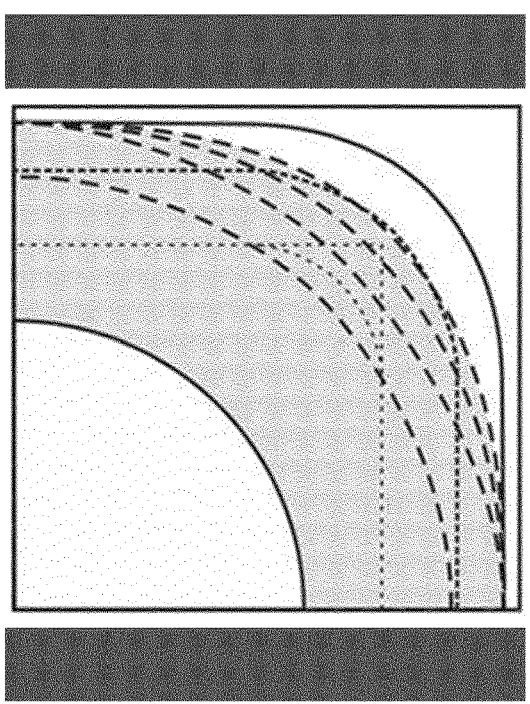
FIG. 19 is a top-view schematic of a modification of embodiment D.

FIG. 19 is a top-view schematic of a modification of embodiment D.

Figure 20:
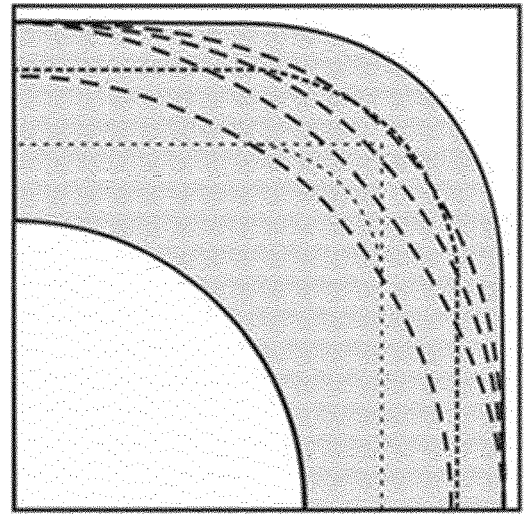
FIG. 20 is a top-view schematic of a modification of embodiment E.

FIG. 20 is a top-view schematic of a modification of embodiment E.

FIGS. 18-20 each shows a top-view schematic of an embodiment which may, respectively, be referred to as embodiment C', D' and E', since they are each corresponding to a modification of, respectively, embodiment C, D and E, where the bottom electrode (depicted in, e.g., FIG. 2 a bottom electrode 103), does not extend beyond the piezo-electrically active layer. This does not change the effect of minimizing the total $WFE_{RMS}$.

Figure 21:
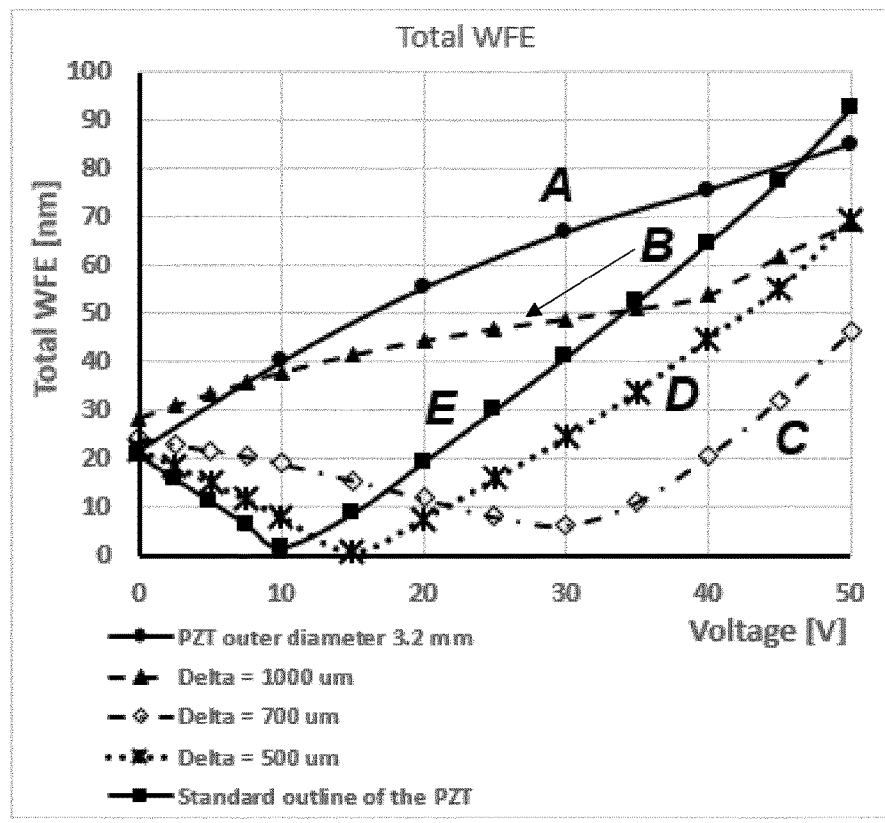
FIG. 21 is a graph showing total $WFE_{RMS}$ for the plurality of examples and embodiments (examples A and D and embodiments B-C-D)

FIG. 21 is a graph showing total $WFE_{RMS}$ for the plurality of examples and embodiments (examples A and D and embodiments B-C-D). FIG. 21 is similar to FIG. 3, except is spans a larger range of voltages (0-50 volt).

Figure 22:
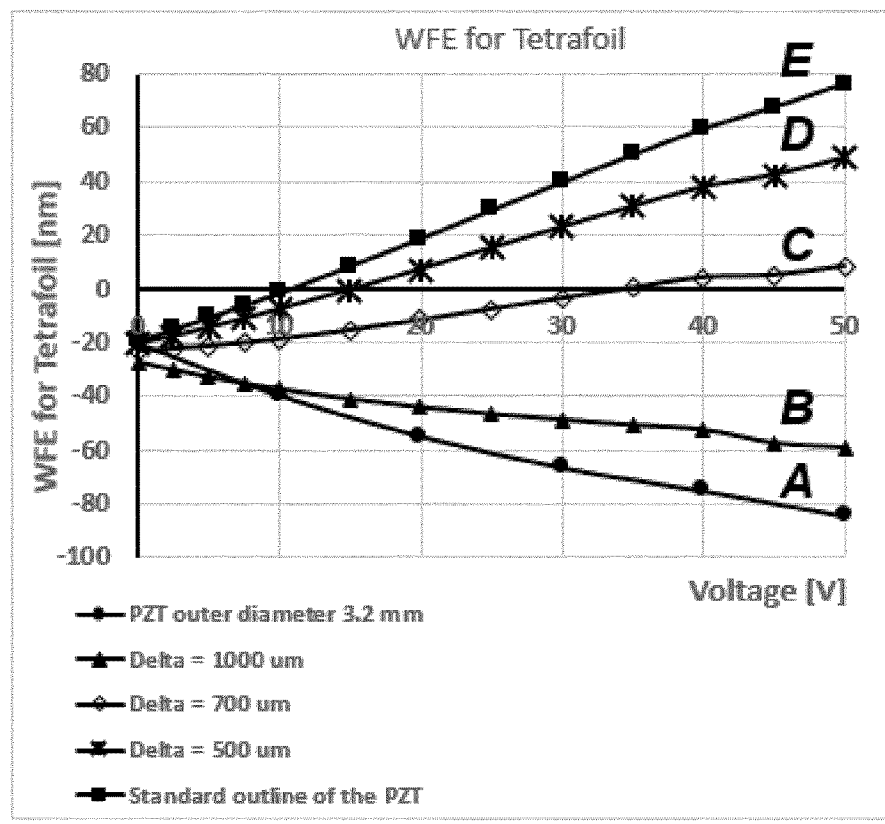
FIG. 22 is a graph showing tetrafoil WFE for the plurality of examples and embodiments (examples A and D and embodiments B-C-D)

FIG. 22 is a graph showing tetrafoil WFE for the plurality of examples and embodiments (examples A and D and embodiments B-C-D). FIG. 22 is similar to FIG. 3, except is spans a larger range of voltages (0-50 volt).

Figure 23:
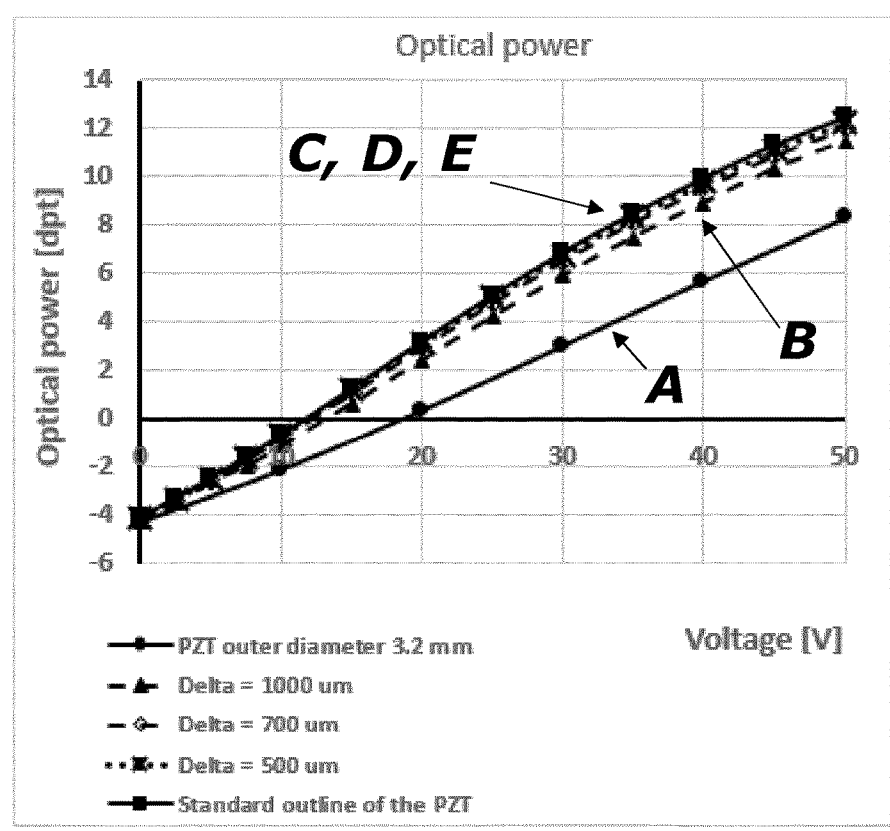
FIG. 23 is a graph showing optical power for the plurality of examples and embodiments (examples A and D and embodiments B-C-D).

FIG. 23 is a graph showing optical power (in diopters [dpt]) for the plurality of examples and embodiments (examples A and D and embodiments B-C-D).

In embodiments or alternative embodiments E1-E15 there is presented:

E1. An optical element (100, 500, 600, 700) comprising:
A support structure (101, 501) with a sidewall (112, 512),
a bendable cover member (102, 502, 702) attached to the sidewall (112, 512),
one or more piezoelectric actuators (103, 104, 105) arranged for shaping said bendable cover member (102, 502, 702) into a desired shape,
wherein said optical element (100, 500, 600, 700) comprises an optically active area (111, 511) with an optical axis (110, 510), wherein
an outer edge (215A-E) of the one or more piezoelectric actuators (103, 104, 105) as observed in a direction being parallel with the optical axis (110, 510) defines a first line, and
an inner edge (109) of the support structure (101, 501) at the interface between the support structure (101, 501) and the bendable cover member (102, 502, 702) as observed in the direction being parallel with the optical axis (110, 510) defines a second line,
wherein the first line and the second line as observed in the direction being parallel with the optical axis (110, 510)
cross each other in two or more positions, and/or
are parallel and coincident in one or more positions.

E2. An optical element (100, 500, 600) according to any one of the preceding embodiments, wherein the optical element is a refractive lens comprising:
at least one deformable transparent lens body (107, 507) surrounded by the sidewall (101, 501) of the support structure, and wherein the bendable cover member (102, 502) is a bendable transparent cover member which is attached to
a surface of said at least one deformable transparent lens body (107, 507).

E3. An optical element (700) according to any one of the preceding embodiments, wherein the optical element is a reflective element, and wherein the bendable cover member (702) is reflective on the side facing away from the support structure and/or on the side facing the support structure.

E4. An optical element (100, 500, 600, 700) according to any one of the preceding embodiments, wherein a total wavefront error ($WFE_{RMS}$) is equal to or less than 60 nm, such as 50 nm, such as 40 nm, such as 30 nm, such as nm, such as nm, throughout a range of 40 volts (such as 0-40 volts), such as a range of 100 volts (such as 0-100 volts), applied to the one or more piezoelectric actuators (103, 104, 105).

E5. An optical element (100, 500, 600, 700) according to any one of the preceding embodiments, wherein a total wavefront error ($WFE_{RMS}$) is equal to or less than 60 nm, such as 50 nm, such as 40 nm, such as 30 nm, such as 25 nm, such as nm, throughout a range of 5 diopters, such as throughout of range of diopters, such as throughout a range of 13 diopters.

E6. An optical element (100, 500, 600, 700) according to any one of the preceding embodiments, wherein
a maximum total wavefront error ($WFE_{RMS}$) throughout a range of 40 volts, such as a range of 100 volts, applied to one or more piezoelectric actuators (103, 104, 105) for a corresponding optical element where the first and second lines do not cross or are parallel and coincident at one or more positions,
is at least 10% larger, such as 20% larger, such as 30% larger, such as 40% larger, such as 50% larger, such as 100% larger, such as 250% larger, than
a maximum total wavefront error ($WFE_{RMS}$) throughout a range of 40 volts, such as a range of 100 volts, applied to the one or more piezoelectric actuators (103, 104, 105) for the optical element wherein the first line and the second line as observed in the direction being parallel with the optical axis (110, 510)
cross each other at two or more positions and/or are parallel and coincident at one or more positions.

E7. An optical element (100, 500, 600, 700) according to any one of the preceding embodiments, wherein the inner edge (109) of the support structure (101, 501) defines an opening for which a circumscribing rectangle or square would have a minimum side-length being equal to or larger than 2.5 mm, such as equal to or larger than 2.8 mm, such as equal to or larger than 3.0 mm, such as equal to or larger than 3.5 mm, such as equal to or larger than 3.8 mm, such as equal to or larger than 4.0 mm, such as equal to or larger than 4.5 mm, such as 5 mm, such as 10 mm.

E8. An optical element (100, 500, 600, 700) according to any one of the preceding embodiments, wherein a thickness (518, 618) of the optical element is equal to or less than 1 mm, such as, such as equal to or less than 700 micrometer, such as equal to or less than 500 micrometer, such as equal to or less than 450 micrometer, such as equal to or less than 425 micrometer, such as equal to or less than 400 micrometer.

E9. An optical element (100, 500, 600, 700) according to any one of the preceding embodiments, wherein the inner edge (109) of the support structure (101, 501) defines an opening for which a circumscribing square may be provided and wherein the first line and the second line as observed in the direction being parallel with the optical axis cross or are parallel and coincident at a position, for which a distance from
a. the middle of a nearest side of the circumscribing square
to
b. a projection of said position onto the nearest side of the circumscribing square,
is within a range of [10; 90]% of half the sidelength of the circumscribing square, such as within a range of [15; 85]%, such as within a range of [20; 80]%, such as within a range of [25; 75]%, such as within a range of [30; 70]%, such as within a range of [40; 60]%, such as within a range of [45; 60]%, such as within a range of [50; 55]%, of half the sidelength of the circumscribing square.

E10. An optical lens (100, 500, 600) according to embodiment E2, wherein said at least one deformable transparent lens body comprises polymer, such as solid polymer.

E11. An optical lens (100, 500, 600) according to any of embodiments E2 or E10, wherein said at least one deformable transparent lens body may have an elastic modulus larger than 300 Pa, a refractive index is above 1.35, and an absorbance in the visible range less than 10% per millimeter thickness.

E12. An optical element (100, 500, 600, 700) according to any one of the preceding embodiments, wherein a diameter of the optically active area is 10 mm or less, such as 7.5 mm or less, such as 5 mm or less, such as 2.5 mm or less, such as 1.55 mm or less, such as 1 mm or less.

E13. A method for manufacturing an optical element (100, 500, 600, 700) according to any one of the preceding embodiments, said method comprising:
Providing the one or more piezoelectric actuators (103, 104, 105) on the bendable cover member (102, 502, 702) by deposition.

E14. A camera comprising
a. an optical element (100, 500, 600, 700) according to any one of embodiments E1-E12, or
b. An optical element (100, 500, 600, 700) as manufactured according to embodiment E13.

E15. Use of
a. an optical element (100, 500, 600, 700) according to any one of embodiments E1-E12, or
b. an optical element (100, 500, 600, 700) as manufactured according to embodiment E13,
for obtaining one or more images.

For the above embodiments or alternative embodiments E1-E15, it may be understood that reference to preceding 'embodiments' may refer to preceding embodiments within embodiments E1-E15.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:
1. An optical element comprising:
a support structure having a sidewall,
a bendable cover member attached to the sidewall, and
a piezoelectric actuator configured to shape said bendable cover member into a predetermined shape, wherein the piezoelectric actuator comprises a piezoelectric material and electrode layers above and/or below the piezoelectric material,
wherein the optical element further comprises:
a. a bottom electrode,
b. a piezoelectric material in the form of a piezoelectrically active layer, and
c. a top electrode,
wherein the position of the piezoelectric actuator, as observed in a direction being parallel with the optical axis, is given by positions, wherein there is an overlap between all of the bottom electrode, the piezoelectrically active layer and the top electrode,
wherein said optical element comprises an optically active area with an optical axis, wherein
the piezoelectric actuator forms a closed line, which completely encloses the optical axis, and an outer edge of the piezoelectric actuator as observed in a direction being parallel with the optical axis defines a first line, wherein the outer edge is a closed line corresponding to the edge of the piezoelectric actuator facing away from the optical axis, and
an inner edge of the support structure at the interface between the support structure and the bendable cover member as observed in the direction being parallel with the optical axis defines a second line, and
wherein the first line and the second line as observed in the direction being parallel with the optical axis
cross each other in two or more positions, and/or
are parallel and coincident in one or more positions.

2. The optical element according to claim 1, wherein above and below refer to a direction parallel to the optical axis where above is in a positive direction from the support structure to the cover member and where below is in a negative direction from the support structure to the cover member.

3. The optical element according to claim 1, wherein a portion of the electrode layers above and/or below the piezoelectric material, which is comprised in the piezoelectric actuator, is the portion, which is intersected by a line parallel to the optical axis, which line also intersects the piezoelectric material.

4. The optical element according to claim 1, wherein the second line defines a rectangle, with rounded corners.

5. The optical element according to claim 1, wherein the second line defines a square with rounded corners.

6. The optical element according to claim 1, wherein the optical element is a refractive lens comprising:
at least one deformable transparent lens body surrounded by the sidewall of the support structure,
wherein the bendable cover member is a bendable transparent cover member which is attached to a surface of said at least one deformable transparent lens body.

7. The optical element according to claim 1, wherein the optical element is a reflective element, and wherein the bendable cover member is reflective on the side facing away from the support structure and/or on the side facing the support structure.

8. The optical element according to claim 1, wherein a total wavefront error ($WFE_{RMS}$) is equal to or less than 60 nm, throughout a range of 40 volts, applied to the piezoelectric actuator.

9. The optical element according to claim 1, wherein a total wavefront error ($WFE_{RMS}$) is equal to or less than 60 nm, throughout a range of 5 diopters.

10. The optical element according to claim 1, wherein:
a maximum total wavefront error ($WFE_{RMS}$) throughout a range of 40 volts, applied to the piezoelectric actuator for a corresponding optical element where the first and second lines do not cross or are parallel and coincident at one or more positions,
is at least 10% larger than
a maximum total wavefront error ($WFE_{RMS}$) throughout a range of 40 volts, applied to the piezoelectric actuator for the optical element wherein the first line and the second line as observed in the direction being parallel with the optical axis cross each other at two or more positions and/or
are parallel and coincident at one or more positions.

11. The optical element according to claim 1, wherein an optically active area corresponds to an optical aperture.

12. The optical element according to claim 1, wherein the bendable cover member is glass.

13. The optical element according to claim 8, wherein the total wavefront error ($WFE_{RMS}$) is measured at 630 nm.

14. The optical element according to claim 1, wherein the piezoelectric actuator encircles the optical axis where an inner edge of the piezoelectric actuator towards the optical axis forms a circle with the optical axis at its center.

15. The optical element according to claim 1, wherein the first line is a square with rounded corners.

16. The optical element according to claim 1, wherein the first line is circular.

17. The optical element according to claim 1, wherein:
said optical lens, has an average within a wavelength range and within the angle of incidence range, transmittance of 95% or more,
a minimum transmittance over the visible range for any visible wavelength, is 94% or more, and/or wherein
an average reflectivity, wherein the wavelength range is confined to any visible wavelength, over the visible range is 2.5% or less.

18. A method for manufacturing an optical element according to claim 1, said method comprising:
providing the piezoelectric actuator on the bendable cover member by deposition.

19. A camera comprising
the optical element according to claim 1.

20. A method of using the optical element according to claim 1 to obtain one or more images comprising acquiring one or more images with the optical element according to claim 1.

* * * * *